（12） United States Patent
Brakob et al.

(10) Patent No.: US 12,400,455 B2
(45) Date of Patent: Aug. 26, 2025

(54) RISK-BASED ADAPTIVE RESPONSES TO USER ACTIVITY IN A RETAIL ENVIRONMENT

(71) Applicant: Target Brands, Inc., Minneapolis, MN (US)

(72) Inventors: Christopher Brakob, Minneapolis, MN (US); Ethan Sommer, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 344 days.

(21) Appl. No.: 18/298,124

(22) Filed: Apr. 10, 2023

(65) Prior Publication Data

US 2023/0386217 A1    Nov. 30, 2023

Related U.S. Application Data

(60) Provisional application No. 63/346,767, filed on May 27, 2022.

(51) Int. Cl.
  *G06V 20/52*   (2022.01)
  *G06Q 20/20*   (2012.01)
  *G06V 10/70*   (2022.01)
  *G06V 20/40*   (2022.01)

(52) U.S. Cl.
  CPC .......... *G06V 20/52* (2022.01); *G06Q 20/208* (2013.01); *G06V 10/70* (2022.01); *G06V 20/44* (2022.01); *G06V 2201/07* (2022.01)

(58) Field of Classification Search
  CPC ........ G06V 20/52; G06V 10/70; G06V 20/44; G06V 2201/07; G06Q 20/208

USPC ......................................................... 340/540
  See application file for complete search history.

(56) References Cited

U.S. PATENT DOCUMENTS

| | | | | |
|---|---|---|---|---|
| 7,673,797 B2 * | 3/2010 | Edwards | ................ | G06Q 30/00 235/383 |
| 8,856,032 B2 * | 10/2014 | Carlegren | ............ | G06Q 20/208 705/16 |
| 10,339,511 B2 * | 7/2019 | Aziz | .................... | G06Q 20/382 |
| 11,455,641 B1 * | 9/2022 | Shahidzadeh | ......... | H04L 67/306 |
| 2012/0323621 A1 | 12/2012 | Carlegren et al. | | |

(Continued)

*Primary Examiner* — Kerri L Mcnally
(74) *Attorney, Agent, or Firm* — Barnes & Thornburg LLP

(57) ABSTRACT

The disclosed technology provides for automatically detecting and responding to potentially suspicious or risky activity in a retail environment. A method can include receiving, from monitoring devices in a retail environment, a stream of activity data, applying a model to the stream of activity data to identify a portion of the data corresponding to guest activity during a checkout process, identifying whether a risk event is associated with the activity, determining a guest risk impact score, selecting (i) a particular manual response from among candidate manual responses and (ii) a particular automated response from among candidate automated responses based on the risk impact score satisfying manual response criteria and/or automated response criteria, transmitting instructions to a POS terminal to implement the particular automated response, and/or transmitting instructions to implement the particular manual response to one or more mobile devices, that prompt employees to perform the manual response.

20 Claims, 11 Drawing Sheets

(56) References Cited

U.S. PATENT DOCUMENTS

2014/0176719 A1\* 6/2014 Migdal ................ G08B 29/188
                                                    348/150
2021/0280027 A1\* 9/2021 Wen ................. G08B 13/19608
2023/0130735 A1\* 4/2023 Perrucci ................ G06V 20/53
                                                    382/103

\* cited by examiner

RISK-BASED ADAPTIVE RESPONSES TO USER ACTIVITY IN A RETAIL ENVIRONMENT

INCORPORATION BY REFERENCE

This application claims priority to U.S. Provisional Application Ser. No. 63/346,767 entitled "Risk-Based Adaptive Responses to User Activity in a Retail Environment," filed on May 27, 2022, the disclosure of which is incorporated by reference in its entirety.

TECHNICAL FIELD

This document generally describes devices, systems, and methods related to automatically detecting risky or suspicious user activity within a retail environment, such as through analysis of multiple different sensor signals monitoring the retail environment, and determining appropriate human and/or automated system responses in response to such automatically detected risky/suspicious activity.

BACKGROUND

Retailer environments, such as grocery stores, receive many different types of customers. Some customers can enter a store with the intention of purchasing items. Typically, customers enter a store, collect items they wish to purchase, and then proceed to a checkout lane to purchase the items they have collected. Occasionally customers may intentionally or unintentionally leave a store without paying for some items, though. For example, some customers may forget about items that are located underneath other items, such as items located in the bottom of a shopping cart, and may leave the store without processing those items as part of a checkout process. In other instances, customers may intentionally leave a store without paying for items, and may take measures to hide their activity, such as concealing items inside of a bag or clothing, or potentially swapping barcodes with other items of lower value so that the customer goes through the checkout process but pays for the lower value item identified by the barcode, even though they are leaving with the higher value physical item. Leaving a store without paying for the full value of the item may be considered shoplifting or stealing, and may be considered a shortage with regard to inventory levels in stores.

Some customers can enter a store with intention to cause harm or raise physical and personal safety concerns. For example, a customer can enter the store with a gun holster on their belt, either intentionally (e.g., they intend to cause harm or fear in other customers in the store) or unintentionally (e.g., they forgot to take off the gun holster before entering the store). As another example, a customer can move around the store with body posture and actions intended or unintentionally causing physical or personal safety concerns. As another example, a customer may verbally or physically harass, assault, or abuse another customer or an employee of the store. Any of these actions can be considered safety risks in a store.

Stores may be equipped with various technology that is capable of providing information on customers who enter and leave a store while engaging in risky or suspicious activity. For example, stores may have a camera security system installed that can capture video and/or images of customers who are in the stores. A person, such as a security officer or other employee in the store, may actively and continuously monitor the camera security system in an attempt to identify potential shortages, personal safety risks, or other security events/risks and respond. As mentioned above, customers can hide their activities so as to avoid detection, which can frustrate efforts of security officers to stop or otherwise prevent such activity from occurring.

SUMMARY

The document generally describes technology for automatically detecting risky or suspicious user activity in a retail environment, such as a grocery store, using analysis of multiple different sensor signals that monitor the retail environment and determining appropriate human and/or automated system responses in response to such automatically detected risky and/or suspicious activity. Such responses can be automatically determined, updated/modified, and/or applied during or after a checkout process, such as while a customer (e.g., user, guest) is scanning items at a point of sale (POS) terminal and/or before the user leaves the retail environment. As an illustrative example, a customer who enters a store picks up an item in an electronics department and then a pack of candy before proceeding to a self-checkout lane, but only scans the pack of candy at the POS terminal before attempting the complete the transaction. This customer can be automatically flagged as engaging in suspicious activity. For example, the customer's actions can be automatically detected by devices throughout the store, such as cameras, RFID readers, location devices, scanners, sensors, and/or other devices working in concert to monitor and identify potentially suspicious or risky activity. While the customer is going through a checkout process, a computer system (e.g., an edge computing device, a remote computer system, a cloud-based system, etc.) can receive the data from the in-store devices and analyze the data to generate an activity profile for the customer. The computer system may link the profile to the customer via an objective identifier, such as payment information (e.g., credit card number, mobile wallet information, etc.), account information (e.g., phone number, email, username, password), or other objective information about the customer. The computer system can then assess the activity in the profile based on one or more risk factors to determine whether the customer's activity is risky, suspicious, associated with a shortage event/theft, and/or associated with personal safety/harm. This assessment can be used by the computer system to automatically determine whether and/or how to respond to the activity of the customer, including determining whether such a response should be a human or manual response (e.g., alert worker on their mobile device to ask customer whether they need assistance, alert in-store security personnel) and/or whether such response should be an automated system response (e.g., provide prompt on POS terminal asking whether additional items need scanning before completing checkout process, flash assistance lights at POS terminal, decline to complete transaction until worker resolves potential discrepancy).

The disclosed technology can escalate and elevate responses based on a variety of factors, such as the severity of the risky/suspicious activity, changes in the severity during the activity (e.g., customer becoming more agitated/hostile), and/or historical interactions with a customer that may warrant elevated/reduced responses. For example, the computer system can automatically determine that the particular customer has appeared on a watch list for the store both recently and frequently (e.g., the user was put on the watch list in the past for being associated with organized crime and/or other thefts). This factor can elevate a type of response (e.g., human or automated system response) and/or a severity of the response (e.g., monitoring the user, stopping a transaction during the checkout process, apprehending the user, etc.). Accordingly, the computer system can select an appropriate manual response, such as an employee in the store being prompted on their mobile device to apprehend the user at the self-checkout lane instead of merely monitoring the user, and/or can select an appropriate automated response, such as providing a prompt at a POS terminal of the self-checkout lane asking the customer to re-scan their item(s).

The disclosed technology can apply more friction to the determination of type and severity of response to be taken before the customer leaves the store as the user activity is assessed as being more serious, suspicious, certain, and/or risky. In other words, the disclosed technology can escalate a response type and action to the customer's activity when the disclosed technology assesses the customer's activity as being more risky and/or suspicious. An escalated response that is automatically selected, using the disclosed technology, for a risky/suspicious situation can include, for example, apprehending the customer, stopping and/or cancelling their transaction, requiring an employee in the store to check the customer's bags and/or person before leaving the store, calling on law enforcement to intervene, generating a security casefile for the customer, adding the customer to a watch list for the store, etc.

The disclosed technology can apply less friction to the determination of type and severity of response to be taken based on assessing the user activity as being less serious, suspicious, certain, and/or risky. The disclosed technology can provide deescalated responses in such scenarios. A deescalated response can include, for example, simply monitoring the customer during the current shopping experience and/or future shopping experiences. The response can also include prompting the customer to rescan their item(s) at the self-checkout lane. The response can include notifying the customer at the POS terminal that something appears wrong with their current transaction. As another example, the response can include prompting an employee of the store to approach and assist the customer. One or more other responses may also be generated and/or invoked according to the determined friction level.

A variety of factors can be used to determine degrees of friction to apply, as well as the type of responses to deploy, including the value of items that are potentially at risk of being stolen. For example, during the checkout process, the computer system can receive transaction data. Based on analyzing the transaction data and other data received from devices in the store, the computer system can determine that it is possible the customer is engaging theft, can identify the items that are potentially being stolen, and can determine the value of those items. The value of those items can be compared to one or more thresholds and, if the value of the items is less than a threshold cost value, the computer system may determine that less friction should be applied to the determination of type and severity of response to the customer's actions. For instance, the computer system may determine that prompting the customer at the POS of the self-checkout lane to re-scan their items may be sufficient in this example. If, on the other hand, the value of the items is greater than one or more thresholds, the computer system may determine that more friction should be applied to generate an escalated response, such as instructing an employee at their mobile device to approach the customer at the self-checkout lane and help the customer through the checkout process.

One or more embodiments described herein can include a system for automatically detecting and responding to potentially suspicious or risky activity in a retail environment, the system including: one or more monitoring devices positioned throughout the retail environment that can be configured to generate a stream of activity data detailing activity within the retail environment, a point of sale (POS) terminal that includes at least (i) a scanner that can be configured to scan item identifiers during a checkout process, (ii) a display device that can be configured to display information during the checkout process, and (iii) a payment terminal that can be configured to receive and process payment information during the checkout process, a group of mobile devices that may be associated with employees within the retail environment, each of the group of mobile devices including at least (i) a wireless transceiver that can be configured to wirelessly transmit and receive information, (ii) a user interface that can be configured to output information to and to receive input from a corresponding user, and (iii) an indoor location module that can be configured to determine and transmit location information, and a computer system in communication with the one or more monitoring devices, the point of sale terminal, and the group of mobile devices. The computer system can be configured to perform operations including: receiving, from the one or more monitoring devices, the stream of activity data, applying a model to the stream of activity data to identify a portion of the stream of activity data corresponding to activity of a guest during the checkout process, the model being trained to identify features in the portion of the stream of activity data indicative of a risk event, identifying, based on the portion of the stream of activity data, whether a risk event is associated with the activity of the guest during the checkout process, determining a risk impact score for the guest based on a determination that the risk event is associated with the activity of the guest, determining a risk confidence score for the guest, the risk confidence score indicating a likelihood that the activity of the guest is associated with the risk event, generating a response friction level for the activity of the guest based on determining whether at least one of the impact score and the confidence score satisfy risk criteria, the response friction level corresponding to a escalation of a type of response to be taken for the activity of the guest, selecting (i) a particular manual response from among a group of candidate manual responses to the activity of the guest and (ii) a particular automated response from among a group of candidate automated responses to the activity of the guest based, at least in part, on the response friction level satisfying at least one of manual response criteria and automated response criteria, transmitting instructions to the POS terminal to implement the particular automated response, in which transmitting the instructions may cause the particular automated response to be provided using one or more of the scanner, the display device, and the payment terminal, selecting one or more mobile devices from among the group of mobile devices based, at least in part, on the location information for the mobile devices relative to a location of the POS terminal, and transmitting instructions to implement the particular manual response to the selected one or more mobile devices, in which transmitting the instructions may cause corresponding instructions to be outputted in the user interface at the selected one or more mobile devices to prompt corresponding employees to perform the manual response with regard to the guest at the POS terminal.

In some implementations, the embodiments described herein can optionally include one or more of the following features. For example, the one or more monitoring devices can include at least one of cameras, RFID readers, location-based signaling devices, mobile devices, and point of sale (POS) terminal checkout lanes. The risk event can be a shortage event that includes at least one of theft, shoplifting, ticket switching, and sweethearting. The risk event can be a security event that includes at least one of bodily harm, physical threat, verbal threat, terror, aggression, carrying a weapon in the retail environment, and assault. The stream of activity data can include unstructured data. The one or more monitoring devices can include a camera that can be configured to generate the stream of activity data that may include at least one of image data or video data. The one or more monitoring devices can include the POS terminal, the POS terminal being configured to generate the stream of activity data that can include transaction data during the checkout process. The one or more monitoring devices can include a location-based signaling device that can be configured to generate the stream of activity data that includes location-based data of at least one of (i) a mobile device of the guest as the guest moves throughout the retail environment and (ii) a shopping cart that the guest pushes throughout the retail environment. The stream of activity data can include system-based inferences, the POS terminal being configured to generate a system-based inference indicating that the guest likely performed ticket switching based on identifying, during the checkout process, a mismatch between an item identifier that the guest scanned with the scanning device and an item imaged during the checkout process. The computing system can be an edge computing device. The operations further can include identifying and associating a portion of the stream of activity data with a guest currently using the POS terminal during the checkout process.

As another example, selecting the particular manual response from among the group of candidate manual responses to the activity of the guest can include selecting the manual response based on at least one of (i) the manual response being an expected response to the activity of the guest, (ii) the response friction level exceeding a threshold friction value, and (iii) labor resources in the retail environment satisfying a threshold labor availability condition to provide for manual response to the activity of the guest. Sometimes, selecting the particular automated response from among the group of candidate automated responses to the activity of the guest can include selecting the automated response based on at least one of (i) the automated response being an expected response to the activity of the guest, (ii) the response friction level being less than a threshold friction value, and (iii) labor resources in the retail environment not satisfying a threshold labor availability condition to provide for a manual response the activity of the guest.

As another example, selecting the particular manual response from among the group of candidate manual responses to the activity of the guest can include selecting at least one of: instructions that, when outputted at the selected one or more mobile devices, prompt the corresponding employees to let the activity of the guest pass, instructions that, when outputted at the selected one or more mobile devices, prompt the corresponding employees to observe the guest, instructions that, when outputted at the selected one or more mobile devices, prompt the corresponding employees to approach the guest at the POS terminal and provide assistance during the checkout process, instructions that, when outputted at the selected one or more mobile devices, prompt the corresponding employees to investigate the activity, instructions that, when outputted at the selected one or more mobile devices, prompt the corresponding employees to approach the guest and perform a receipt check before the guest exits the retail environment, and instructions that, when outputted at the selected one or more mobile devices, prompt the corresponding employees to approach and apprehend the guest. In some implementations, (i) can be selected based on the response friction level being within a first range of friction values, (ii) can be selected based on the response friction level being within a second range of friction values greater than the first range of friction values, (iii) can be selected based on the response friction level being within a third range of friction values greater than the first and second ranges of friction values, (iv) can be selected based on the response friction level being within a fourth range of friction values greater than the first, second, and third ranges of friction values, (v) can be selected based on the response friction level being within a fifth range of friction values greater than the first, second, third, and fourth ranges of friction values, and (vi) can be selected based on the response friction level being within a sixth range of friction values greater than the first, second, third, fourth, and fifth ranges of friction values.

In some implementations, selecting the particular automated response from among the group of candidate automated responses to the activity of the guest can include selecting at least one of: instructions that, when executed by the POS terminal, causes POS terminal to perform no action and let the activity pass, instructions that, when executed by the POS terminal, causes POS terminal to present, at the display device, checkout tips to guide the guest through the checkout process, instructions that, when executed by the POS terminal, causes POS terminal to actuate a lane light at the POS terminal, in which actuating the lane light causes the lane light to flash, instructions that, when executed by the POS terminal, causes POS terminal to automate, at at least one of the display device and the payment terminal, a charge to a transaction of the guest, instructions that, when executed by the POS terminal, causes POS terminal to generate an alert that is transmitted to a mobile device of security personnel in the retail environment, and instructions that, when executed by the POS terminal, causes POS terminal to prevent the guest from (a) continuing to scan items with the scanner, (b) continuing the checkout process through the display device, or (c) completing the checkout process through the payment terminal. Sometimes, (i) can be selected based on the response friction level being within a first range of friction values, (ii) can be selected based on the response friction level being within a second range of friction values greater than the first range of friction values, (iii) can be selected based on the response friction level being within a third range of friction values greater than the first and second ranges of friction values, (iv) can be selected based on the response friction level being within a fourth range of friction values greater than the first, second, and third ranges of friction values, (v) can be selected based on the response friction level being within a fifth range of friction values greater than the first, second, third, and fourth ranges of friction values, and (vi) can be selected based on the response friction level being within a sixth range of friction values greater than the first, second, third, fourth, and fifth ranges of friction values.

As another example, the operations can also include determining, based on execution of the selected (i) particular manual response and (ii) particular automated response and the stream of activity data received from the one or more monitoring devices, that the guest continues to perform the activity, adjusting, based on the determination that the guest continues to perform the activity, at least one of the risk impact score and the risk confidence score by a predetermined amount, increasing, based on the adjusted at least one risk impact score and risk confidence score, the response friction level, and selecting at least one of another manual response from among the group of candidate manual responses and another automated response from among the group of candidate automated responses based on the increased response friction level, in which the selected another manual response or another automated response is an escalation of the previously selected particular manual response or the particular automated response.

Sometimes, determining a risk impact score for the guest can include: determining, based on transaction data received from the POS terminal during the checkout process, a value of an item associated with the activity of the guest and assigning the risk impact score above a threshold impact value based on the value of the item exceeding a threshold item cost value. Determining a risk impact score for the guest can also include: identifying, based on applying the model to the stream of activity data, a safety threat in the activity of the guest and assigning the risk impact score above a threshold impact value based on the identified safety threat satisfying safety risk criteria. Determining a risk confidence score for the guest may include: analyzing, based on applying the model to the stream of activity data, the portion of the stream of activity data to identify a weapon, the portion of the stream of activity data being image data, and assigning the risk confidence score above a threshold confidence value based on the identification of the weapon.

In some implementations, determining whether at least one of the impact score and the confidence score satisfy risk criteria can include determining that at least one of the impact score and the confidence score exceed a safety risk threshold value. Determining whether at least one of the impact score and the confidence score satisfy risk criteria can also include determining that at least one of the impact score and the confidence score exceed a shortage risk threshold value. Determining whether at least one of the impact score and the confidence score satisfy risk criteria can include: aggregating the impact score and the confidence score to generate a general risk score for the guest and determining that the risk criteria is satisfied based on a determination that the general risk score exceeds a general risk threshold value.

Sometimes, generating a response friction level for the activity of the guest can include assigning a value to the response friction level that is above a threshold friction value based on at least one of the impact score and the confidence score satisfying the risk criteria. Generating a response friction level for the activity of the guest can also include assigning a value to the response friction level that is below a threshold friction value based on at least one of the impact score and the confidence score not satisfying the risk criteria. In some implementations, selecting (i) a particular manual response from among a group of candidate manual responses to the activity of the guest and (ii) a particular automated response from among a group of candidate automated responses to the activity of the guest can also include: retrieving, from a data store, a watch list for the retail environment, determining whether an objective identifier associated with the guest appears on the watch list, and selecting at least one of (i) and (ii) based on a determination that the objective identifier associated with the guest appears on the watch list. Moreover, determining a risk impact score for the guest can further be based on the activity of the guest satisfying risk impact criteria.

One or more embodiments described herein can include a method for automatically detecting and responding to potentially suspicious or risky activity in a retail environment, the method including: receiving, from one or more monitoring devices positioned throughout a retail environment, a stream of activity data detailing activity within the retail environment, applying a model to the stream of activity data to identify a portion of the stream of activity data corresponding to activity of a guest during a checkout process, identifying, based on the portion of the stream of activity data, whether a risk event is associated with the activity of the guest during the checkout process, determining a risk impact score for the guest based on a determination that the risk event is associated with the activity of the guest, selecting (i) a particular manual response from among a group of candidate manual responses to the activity of the guest and (ii) a particular automated response from among a group of candidate automated responses to the activity of the guest based, at least in part, on the risk impact score satisfying at least one of manual response criteria and automated response criteria, transmitting instructions to a POS terminal to implement the particular automated response, in which transmitting the instructions causes the particular automated response to be provided using one or more of a scanner, a display device, and a payment terminal of the POS terminal, selecting one or more mobile devices from among a group of mobile devices based, at least in part, on location information for the mobile devices relative to a location of the POS terminal, and transmitting instructions to implement the particular manual response to the selected one or more mobile devices, in which transmitting the instructions causes corresponding instructions to be outputted in a user interface at the selected one or more mobile devices to prompt corresponding employees to perform the manual response with regard to the guest at the POS terminal.

The system can optionally include one or more of the abovementioned features. The system can also optionally include one or more of the following features. For example, the method can also include determining a risk confidence score for the guest, the risk confidence score indicating a likelihood that the activity of the guest is associated with the risk event, generating a response friction level for the activity of the guest based on determining whether at least one of the impact score and the confidence score satisfy risk criteria, the response friction level corresponding to an escalation of a type of response to be taken for the activity of the guest, and selecting (i) the particular manual response from among the group of candidate manual responses to the activity of the guest and (ii) the particular automated response from among the group of candidate automated responses to the activity of the guest based, at least in part, on the response friction level satisfying at least one of the manual response criteria and the automated response criteria. The model could have been trained to identify features in the portion of the stream of activity data indicative of a risk event. Moreover, the method can include determining the risk impact score based on the activity of the guest satisfying risk impact criteria.

The devices, system, and techniques described herein may provide one or more of the following advantages. For example, the disclosed technology provides for automatically and efficiently leveraging existing resources in a retail environment to deter or otherwise prevent security events (e.g., shortages, theft, personal safety, physical harm, etc.) in real-time or near real-time. Labor resources (e.g., available employees on a store sales floor), for example, can be saved for responding to more serious security events and automated system responses can be used to respond to less serious security events (e.g., in situations where there is a labor shortage, for example) in real-time. As a result, available resources in the retail environment can be used to prevent one or more security events arising in the retail environment at or around the same time.

The disclosed technology can also enhance and increase effectiveness/accuracy of checkout processes depending on real-time risks associated with the respective checkout processes. In so doing, the disclosed technology can provide for creating sufficient friction to deter and/or stop shortages or other security-related events in the retail environment.

Similarly, the disclosed technology can provide for objectively responding to potential (and/or more certain) risks in the retail environment without targeting, tracking, or monitoring specific customers associated with the risks. Such technology can provide for objectively and accurately identifying and responding to risks in the retail environment without invoking human bias, profiling, and/or error that may arise when a human, such as a security officer, monitors customers in the retail environment. As a result, the disclosed technology provides for stopping security events in real-time and near real-time as well as preventing or deterring future security events.

The disclosed technology can also provide for unique and custom response strategies per risky activity identified in the retail environment. The disclosed technology synthesizes and aggregates disparate data from various different devices in the retail environment (e.g., cameras, RFID readers, location signaling devices, POS terminals, user devices, checkout systems, etc.) in real-time and/or near real-time to make accurate risk assessments and determine appropriate responses to the risky activity. The disclosed technology provides for combining and correlating different forms of data, information, and system-generated inferences using objective factors. Labeling and classification techniques can be used to correlate the different types of information, which, at first blush, may not appear related to each other. As a result, security events (e.g., risky activity) can be more accurately identified, associated with customers, and leveraged to determine appropriate responses. The disclosed technology also leverages various risk rules, factors, and criteria to assess user activity and determine appropriate human and/or automated responses to the activity. As a result, the disclosed technology provides for stopping, preventing, and/or deterring such activity.

Moreover, employees in the retail environment, such as security officers, may not have the ability or time to sift through robust amounts of data in various different data types/formats in real-time before a customer associated with risky activity leaves the store. As a result, the employees may inaccurately assess a level of risk that the customer's activity poses and may end up determining inappropriate responses to the activity (e.g., inefficient use of labor resources when a simple prompt at the POS terminal to rescan an item would have been more efficient/accurate). The employees may also determine a response too late, in that the customer associated with the risky activity may already leave the retail environment. Thus, the risky activity may not be stopped and/or deterred. Moreover, the employees can make mistakes about risky activity and how to respond based on making rushed and/or incomplete reviews of all the data to sift through. Such mistakes can include apprehending, monitoring, or profiling a customer who has not acted in any risky or suspicious way in the retail environment. Such mistakes can result in alienating customers and fostering a poor user experience in the store. The disclosed technology, on the other hand, removes potential human error and inefficiencies to accurately and quickly make decisions about appropriate responses to take in real-time and/or near real-time.

As another example, the disclosed technology provides for determining amount of friction to apply to a response decision and escalation of the response based on analysis of the risky activity attributed to the customer. The amount of friction and escalation can be determined objectively and without potential human bias and/or profiling of customers in the retail environment. The amount of friction and escalation can be determined based on thorough and quick analysis of robust amounts of disparate data that is attributed to the customer engaging in the risky activity. Therefore, the amount of friction and escalation can be accurate and objective metrics used to determine an appropriate response, whether human or automated system response, to the risky activity in real-time or near real-time.

Similarly, risky activity can be attributed to customers in the retail environment using objective identifiers. This can eliminate potential human bias, profiling, tracking, or subjective monitoring of the customers in the retail environment. This technology can also eliminate human bias, error, and/or assumptions made when analyzing large amounts of data quickly, in little time, and trying to correlate that data with a particular customer to determine a responsive action before the particular customer leaves the retail environment. Moreover, the objective identifiers can be used to accurately and quickly identify customers during future activities in the retail environment. After all, a customer can change their appearance (e.g., hair color, clothes, posture, actions, etc.), but the customer (or another customer working with the customer in concert) may use the same account information (e.g., phone number, email, username, password) and/or payment information (e.g., credit card number, mobile wallet information) when engaging in activities in the retail environment. The disclosed technology therefore provides for quick, efficient, accurate, and objective assessment of large amounts of data to identify, stop, prevent, and/or deter the risky activity that is objectively attributed to the particular customer in the retail environment.

As another example, stitching together disparate pieces of data and information can be advantageous to predict likelihood of future risky activity of customers who pose specific security threats. Such data-driven, objective predictions can be used by the in-store employees and/or the computer system to monitor customers who pose specific security threats and take actions to resolve security events involving the particular customers and/or to prevent/mitigate/deter potential future security events involving such customers. Similarly, such data-driven objective predictions can be made quickly and efficiently on the fly in real-time or near real-time at the POS terminal, on an edge computing device, and/or by a remote computing system at the retail environment. These predictions can be made as the customer performs a checkout process so that appropriate responses can be taken before the customer leaves the retail environment to prevent current risky activity and also to deter future risky activity by the customer or by others that the customer may be working in concert with.

Associating unstructured data (e.g., raw data such as video feeds, images, location information) and system-based inferences (e.g., inferred conclusions such as a customer bypassing a scanner with a product) can also be advantageous to build robust, accurate, unbiased activity profiles. Such activity profiles can be assessed against various risk factors and criteria to determine an appropriate and unique response that may stop the current activity and/or prevent/deter future activity.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to determining, in real-time and/or near real-time, appropriate human and/or automated system responses to invoke with regard to risky activity in a retail environment. Devices in the retail environment can generate data indicating potentially risky activity. A computer system can assess the data to determine whether the activity is risky and/or objectively attribute the activity to a particular customer in the retail environment. The computer system can then determine, in real-time or near real-time, an appropriate response to the activity based on the assessed risk and/or various other risk factors. Using the disclosed technology, safety and security events can be accurately and efficiently stopped, prevented, and/or deterred in real-time or near real-time while also leveraging available resources in the retail environment (e.g., labor resources, such as skills of the employees, quantity of employees currently working when a response is needed, etc.) and efficiencies/capabilities of devices in the retail environment (e.g., compute resources, POS terminals providing notifications to customers during checkout processes, POS terminals cancelling or stopping suspicious transactions during the checkout processes, etc.).

The risky activity can include shoplifting, theft, sweethearting, and other shortage/related events. The risky activity can also include personal safety threats, physical harm, bodily harm, assault, or other security and/or safety related events. The disclosed technology can be applied to a variety of establishments and/or retail environments, including but not limited to grocery stores, clothing stores, stores that sell a variety of different types of items, malls, and other types of retail environments/stores.

Figure 1A:
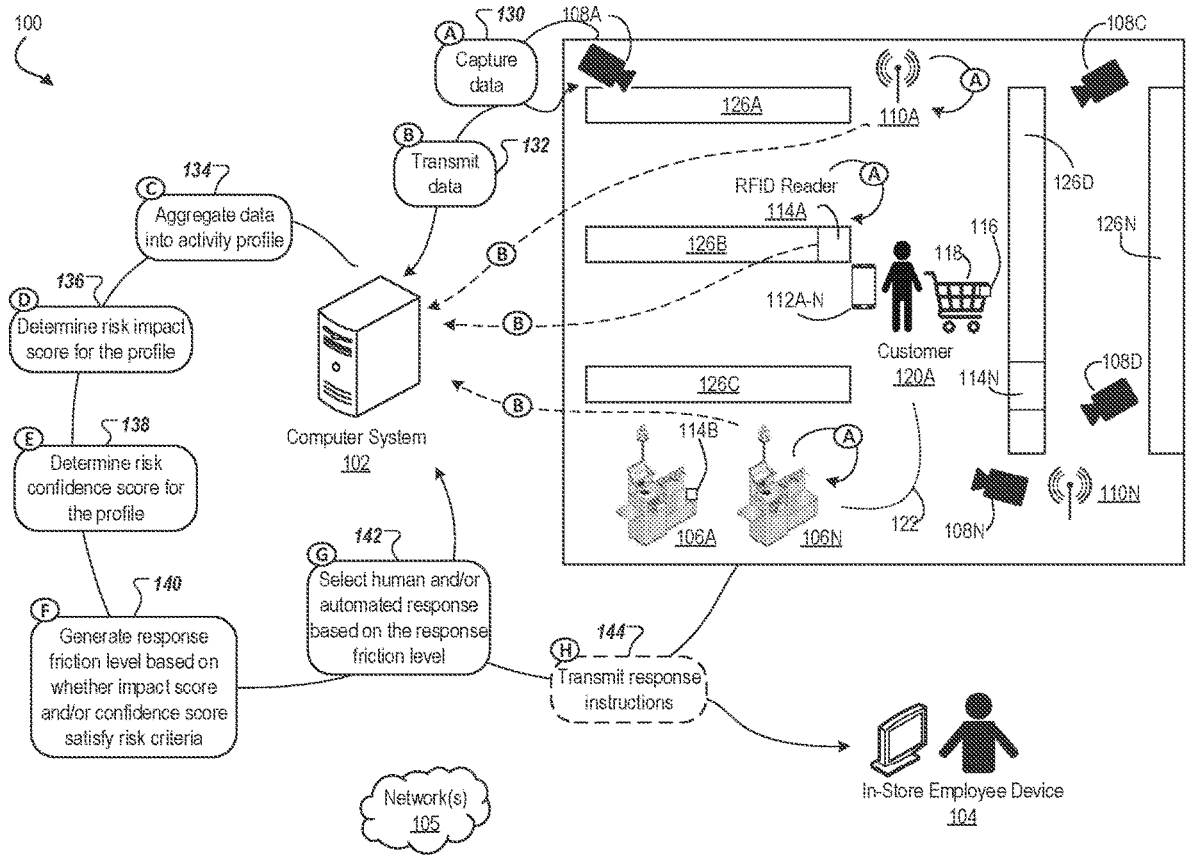
FIG. 1A is a conceptual diagram for determining a human and/or automated system response to risky user activity in a retail environment.

Referring to the figures, FIG. 1A is a conceptual diagram for determining a human and/or automated system response to risky user activity in a retail environment 100. A computer system 102 can be in communication (e.g., wired and/or wireless) with an in-store employee device 104 via network(s) 105. In some implementations, the computer system 102 can be in communication with multiple in-store employee devices. The computer system 102 can also be a remote computing system in communication with in-store employee devices that are associated with a plurality of retail environments or stores. For example, the computer system 102 can be a central computing system configured to determine responses to various activities detected in different stores in a network of stores. In some implementations, each of the plurality of stores in the network can include a computer system that is configured to assess checkout activities and determine appropriate responses.

The in-store employee device 104 can be a mobile device such as a smartphone, tablet, laptop, and/or computer. An in-store employee can use the device 104 in order to monitor activity in the store environment, including customers (e.g., guests) who pose specific security threats. The in-store employee, such as safety and security personnel, can be tasked with ensuring safety and security in the store environment. In some implementations, the device 104 can be in communication with a camera security system in the store environment 100. The in-store employee can view an image data feed from the camera security system at the device 104. The in-store employee can use the device 104 in order to identify customers who pose specific security threats, monitor them, and take some response action to such customers when they are engaged in or believed to be engaging in activity that poses a security threat (e.g., before the customers leave the retail environment 100).

The retail environment 100 can be any type of store, such as a grocery store, clothing store, or other type of store selling goods/products to be purchased by customers (e.g., users, guests). The retail environment 100 can include shelves 126A-N. The shelves 126A-N can be arranged into aisles that customers can move up and down. The shelves 126A-N can include a variety of items that the customers can purchase. The retail environment 100 can also include point-of-sale (POS) checkout lanes 106A-N. In some implementations, the POS checkout lanes 106A-N can be self-checkout lanes. One or more of the POS checkout lanes 106A-N can also be checkout counters with an employee who scans a customer's items from their cart or basket.

The retail environment 100 can also include different devices and/or systems that are placed throughout the retail environment 100. The devices and/or systems can be used to track movement of customers and items therein. The devices and/or systems can be edge devices that perform edge computing processing techniques. The devices and/or systems can generate unstructured data as well as inferences based on the unstructured data. The devices and/or systems can be in communication with the computer system 102 via network(s) 105. The computer system 102 can be a central computing system, computer, server, and/or network of computers or servers. The devices and/or systems can transmit, to the computer system 102, the unstructured data and inferences. The computer system 102, as described herein, can further process the transmitted information to determine whether a customer, such as customer 120A, is engaging in suspicious activity and generate an appropriate response to that activity.

Still referring to FIG. 1A, the devices and/or systems placed throughout the retail environment 100 can include cameras 108A-N, location-based signaling devices 110A-N, and RFID readers 114A-N. One or more additional or fewer types of devices and/or systems can be placed throughout the retail environment 100. Moreover, the devices and systems described herein can be positioned near and/or around aisles, shelves 126A-N, departments, or other areas in the retail environment 100. One or more of the devices and systems can also be positioned near and/or around entrances and exits of the retail environment 100. Moreover, one or more of the devices and systems can be positioned near, around, and/or as part of the checkout lanes 106A-N.

The cameras 108A-N can be configured to continuously capture image and/or video data of portions of the retail environment 100 within their field of views. One or more of the cameras 108A-N can be high resolution cameras. One or more of the cameras 108A-N can be low resolution cameras. One or more of the cameras 108A-N can also be pan-tilt-zoom cameras. One or more of the cameras 108A-N can be wide angle cameras to capture more activity in the retail environment 100. The cameras 108A-N can be any other camera configurations that are already installed in the retail environment 100. For example, the cameras 108A-N can be part of a security camera system or CCTV system.

The location-based signaling devices 110A-N can be configured to identify when customers pass the devices 110A-N or are nearby the devices 110A-N. The devices 110A-N can generate timestamps indicating when a customer passes or is nearby. The devices 110A-N can detect customer presence based on signals and/or location information from the customers' mobile devices. The devices 110A-N can also detect customer presence based on location signals or other location information from sensors on a shopping cart or basket that the customer is bringing around the retail environment 100. For example, customer 120A has mobile device 112A. Mobile device 112A can be a cell phone, smartphone, laptop, tablet, or other mobile computing device that the customer 120A may bring with them to the store. If the customer 120A moves towards or comes into range with the location-based signaling device 110A, the location-based signaling device 110A can ping the mobile device 112A and receive a mobile device identifier, such as a MAC address. The MAC address can be correlated with a timestamp generated by the device 110A that indicates the customer 120A was nearby. Thus, the location of the customer 120A in the retail environment 100 at a particular time can be documented by the device 110A using an objective identifier: the MAC address of the mobile device 112A.

The RFID readers 114A-N can be configured to detect when an RFID tag comes within a vicinity or range of any one or more of the readers 114A-N. RFID tags can be attached to shopping carts, baskets, other equipment used in the retail environment 100 as well as products, such as clothes, blankets, pillows, and other less-structured items for sale in the retail environment 100. As an illustrative example, the customer 120A can be pushing a shopping cart 118 around the retail environment 100. The shopping cart 118 can have an RFID tag 116, which can be used to identify the shopping cart 118. Each shopping cart can have a unique RFID tag. Here, the customer 120A pushes the shopping cart 118 past or near the RFID reader 114A, and the reader 114A can detect the RFID tag 116 on the shopping cart 118. The reader 114A can, for example, determine that the shopping cart 118 was near the shelf 126B at a time at which the reader 114A detected the RFID tag 116. Similarly, when the customer 120A moves the shopping cart 118 to the POS checkout lane 106N, the RFID reader 114N can detect the RFID tag 116 and identify that the shopping cart 118 is at the POS checkout lane 106N at a particular time.

Still referring to FIG. 1A, one or more of the devices and/or systems 108A-N, 110A-N, 114A-N, and 106A-N can capture data corresponding to particular activity of the customer 120A (block A, 130). For example, the cameras 108A-N can continuously capture image and/or video data in their designated locations. The location-based signaling devices 110A-N can generate timestamps and indications of when customers, such as the customer 120A, passes by or comes into a range of the devices 110A-N. The RFID readers 114A-N can similarly generate timestamps and indications of when shopping carts having RFID tags, such as the shopping cart 118 having the RFID tag 116, come within range of the readers 114A-N. The POS checkout lanes 106A-N can also capture data such as scanned items, images of items in a customer's shopping cart, and transaction receipts/bills.

In some implementations, one or more of the devices and/or systems 108A-N, 110A-N, 114A-N, and 106A-N can generate inferences based on the captured data. For example, the checkout lane 106N can generate an inference as to whether the customer 120A is likely shoplifting during a checkout process. The customer 120A can scan products at the POS checkout lane 106N. The POS checkout lane 106N can include a camera configured to capture image data of an area around the POS checkout lane 106N. Using edge computing, the POS checkout lane 106N can analyze the image data and match it to barcodes of the products that the customer 120A scanned. The POS checkout lane 106N can determine that there is a mismatch between products that appear in the image data and products that are scanned. The mismatch can indicate that the customer 120A may be shoplifting. Accordingly, the POS checkout lane 106N can generate an inference that the customer 120N may be engaged in activity that poses a security threat.

As another example, the RFID reader 114A can identify that customer 120A passing by the shelf 126B with the shopping cart 118 at a first time. The customer 120A can continue moving between the shelves 126B and 126C. Once the customer 120A reaches the end of the shelves 126B and 126C, the customer 120A can decide to turn around, walking back the same way that they came. Thus, when the customer 120A reaches the end of the shelves 126B and 126C, the RFID reader 114A can identify the shopping cart 118 at a second time. Using edge computing, the RFID reader 114A can determine an amount of time that passed between the first time and the second time. The RFID reader 114A can infer, based on the amount of time that passed, whether the customer 120A spent longer between the shelves 126B and 126C than expected. If the customer 120A spent longer than expected, the RFID reader 114A can infer that the customer 120A may be engaged in activity that poses a security threat.

Alone, the RFID reader 114A's inference may not positively identify that the customer 120A in fact engaged in activity that poses a security threat. However, in combination with image data from the camera 108N, for example, the computer system 102 can determine that the customer 120A spent a longer time than expected between the shelves 126B and 126C because the customer 120A was looking at their mobile device 112A. Thus, the customer 120A did not in fact engage in activity that likely poses a security threat. As another example, in combination with the image data from the camera 108N, the computer system 102 can determine that the customer 120A spent a longer time because the customer 120A was trying to swap barcodes on two products. Thus, the computer system 102 can positively identify that the customer 120A engaged in activity that poses a security threat and accordingly determine an appropriate response.

Any of the data captured and/or generated by the devices and/or systems 108A-N, 110A-N, 114A-N, and 106A-N can be transmitted to the computer system 102 (block B, 132). The data can include unstructured data that is captured by the devices and/or systems 108A-N, 110A-N, 114A-N, and 106A-N. The data can also include inferences that are generated as described above. The data can be transmitted at predetermined times or time intervals (e.g., every 1 minute, every 3 minutes, every 5 minutes, every 10 minutes, every 30 minutes, every 1 hour, every 2 hours, every 6 hours, every 12 hours, every 24 hours, etc.). In some implementations, the data can be transmitted when requested by the computer system 102. In yet some implementations, the data can be transmitted as it is captured, in real-time and/or near real-time. For example, the cameras 108A-N can transmit live feeds of images and/or videos that are captured. As another example, the location-based signaling devices 110A-N can transmit location data whenever movement is detected within ranges of such devices 110A-N. The RFID readers 114A-N can also transmit data whenever RFID tags 116 of shopping carts 118 are detected within ranges of such devices 114A-N, for example. Moreover, the POS checkout lanes 106A-N can transmit data, such as receipts, credit card information, scanned items, inferences, and other transaction data whenever a transaction is made at such checkout lanes 106A-N. In yet some implementations, once a checkout process begins at a checkout lane 106A-N, data captured/generated within a threshold amount of time from the checkout process can be requested by the computer system 102 from the devices and/or systems in the retail environment 100. For example, the computer system 102 can request data that was captured/generated approximately 0 to 10 minutes before the checkout process began at the particular checkout lane 106A-N. In some implementations, the threshold amount of time can vary depending on a size of the retail environment 100 (e.g., the larger a store, the more distance a customer may have to travel to get to the checkout lanes 106A-N, so the longer the threshold amount of time). The threshold amount of time can also vary depending on other characteristics of the retail environment 100, including but not limited to a level of busyness/foot traffic (e.g., the busier a store, the longer a customer may wait in line before they can begin the checkout process, so the longer the threshold amount of time).

In block C, the computer system 102 can aggregate the received data into an activity profile (134). The computer system 102 can compile and filter all of the data that was received. The computer system 102 can also apply one or more machine learning-trained models to unstructured data to add structure to that data. Adding structure to the data can include labeling the data and classifying the data based on those labels. For example, a model can be trained to identify, from image data, a person peeling a barcode off a product. The model can be applied to the image data received from the cameras 108A-N. Using the model, the computer system 102 can identify a moment in which the customer 120A in fact removed a barcode from one product and put it on another product. The computer system 102 can label this moment in the image data and classify it as a barcode swap or other activity that poses a security threat classifier. The computer system 102 can also apply a confidence value to this label indicating likelihood that the customer 120A performed a fraudulent activity and/or gravity/seriousness/risk of the performed activity.

Similarly, a model can be trained to identify, from POS transaction data and inferences, whether the customer 120A did not scan all products in the shopping cart 118 and/or whether the customer 120A scanned barcodes that do not match the products in the shopping cart 118 or otherwise at the POS checkout lane 106A. Using the model, the computer system 102 can label and classify the POS transaction data as indicative of a security event, such as shoplifting.

The activity profile can be associated with a particular customer, such as the customer 120A. The association can be made by the computer system 102 using objective identifiers. The objective identifiers can include, but are not limited to, user account information (e.g., username, password, email address), phone number, credit card information, mobile wallet information, drivers license, license plate, email address, MAC address of the customer 120A's mobile device 112A, etc. For example, the customer 120A can go through a checkout process at the checkout lane 106N. The customer 120A can scan a barcode presented at their mobile device 112A to apply a coupon to the products they are scanning to purchase, the barcode indicating the customer's mobile wallet information (e.g., payment information, customer ID or username, email address, MAC address, etc.). The computer system 102 can then associate transaction data during the checkout process with the particular customer 120A based on the mobile wallet information. The computer system 102 can also associate any signals/data from the location-based signaling devices 110A-N identifying the customer 120A's mobile device 112A with the transaction data based on the mobile wallet information. Therefore, the activity profile can include any data that has been captured of the customer 120A during their shopping trip in the retail environment 100.

In some implementations, the computer system 102 can create connections amongst the aggregated data in block C (134). The computer system 102 can apply one or more machine learning-trained models to the data. For example, the models can be trained to correlate data based on their labels and/or classifications. Thus, if image data and POS transaction data both are labeled as barcode swap, the computer system 102 can determine that these two pieces of data correlate with each other and generate a confidence level indicating likelihood that the customer 120A has in fact engaged in ticket swapping.

In block D (136), the computer system 102 can determine a risk impact score for the profile. The risk impact score can indicate a severity of the actions performed by the customer 120A during their shopping trip in the retail environment 100. Determining the risk impact score can be based on transaction data received from the checkout lane 106N in real-time or near real-time. For example, if image data from the camera 108A is processed to determine that the customer 120A pockets an electronic device near the shelf 126A and puts a book inside their cart 118 at or near the same time, the computer system 102 can analyze the customer 120A's transaction data to see whether the electronic device and/or the book is scanned and paid for. The computer system 102 can determine that no electronic device was scanned but a book that cost $20 was scanned. The computer system 102 can determine that the electronic device has likely been stolen and that the electronic device costs approximately $290. If the electronic device's cost exceeds some threshold cost value, then the computer system 102 can determine that the customer 120A is stealing an expensive item and thus their activity has a greater impact on the retail environment 100. Accordingly, the computer system 102 can assign a high risk impact score to the activity profile associated with the customer 120A. As another example, if the cost of the electronic device is less than the threshold cost value (e.g., the electronic device costs the same as the scanned book or otherwise is an inexpensive item), then the computer system 102 can assign a lower risk impact score since the customer 120A may not be engaging in as egregious of theft. As yet another example, the computer system 102 can assign a higher risk impact score if the customer 120A is likely stealing products of a particular category (e.g., electronics, jewelry, or other expensive/costly product categories).

As described throughout this disclosure, the disclosed techniques can be used to identify theft/shortage events as well as safety/security events. Accordingly, the computer system 102 can assign the risk impact score based on how threatening/serious the customer 120A's actions may be towards physical and/or personal safety/security in the retail environment 100. For example, the computer system 102 can assign a higher risk impact score if the customer 120A is likely causing harm or terror to other customers and employees in the retail environment 100 (and/or the customer 120A is visibly carrying a weapon around). The computer system 102 can assign a lower risk impact score if, for example, the customer 120A appears to bump into another customer by accident, causing the other customer to drop the products in their basket.

The risk impact score can be a numeric value on a predetermined scale. For example, the risk impact score can be assigned a value between 1 and 5. The score can also be assigned a value between 1 and 100. One or more other scales can be used, including but not limited to 0 to 5, 0 to 10, 1 to 10, 1 to 50, 0 to 50, 0 to 100, etc. A higher numeric value can indicate a higher risk impact while a lower numeric value can indicate a lower risk impact. One or more other scales and/or values (e.g., Boolean, string, etc.) can be used to define the risk impact score, as described further below.

In block E (138), the computer system 102 can determine a risk confidence score for the activity profile of the customer 120A. The risk confidence score can indicate likelihood that the customer 120A is engaging in risk activity in the retail environment, such as theft/a shortage event and/or a safety/security event. The risk confidence score can be determined based on analyzing the aggregated data in the activity profile. For example, the computer system 102 can receive/retrieve a watch list for the retail environment 100. The watch list can indicate one or more customers who have been identified in the past as potentially engaging in risky/suspicious activity and thus should be monitored. If the activity profile indicates that the customer 120A likely swapped barcodes between a pack of gum and a pair of headphones and the customer 120A appears on the watch list for having repeatedly engaged in similar activities in the past, the computer system 102 can generate a high risk confidence score that the customer 120A is involved in shoplifting or other shortage event. On the other hand, if this appears to be the customer 120A's first offense (e.g., the customer 120A does not appear on the watch list), then the computer system 102 can assign a lower risk confidence score.

The risk confidence score can be a numeric value, Boolean, and/or string value. For example, the risk confidence score can be a numeric/integer value between 0 and 1, where 1 indicates a highest risk confidence score (e.g., the customer 120A is most likely engaging in a risky activity that should be apprehended/stopped) and 0 represents a lowest risk confidence score (e.g., the customer 120A is less likely engaging in a risky activity that should be apprehended/stopped). One or more other scales can be used for defining the risk confidence score. For example, the score can be assigned a value between 1 to 5, 1 to 10, 1 to 50, 1 to 100, etc.

In some implementations, blocks D and E can be performed at the same time. In some implementations, the computer system 102 can determine one risk score, which can be a combination of the risk impact score and the risk confidence score. In yet some implementations, the risk score can be determined as a weighted combination of the risk impact score and the risk confidence score. Sometimes, the computer system 102 can determine the risk score without first determining the risk impact score and the risk confidence score. Instead, the risk score can be determined based on performing similar assessments that the computer system 102 would perform to determine each of the risk impact score in block D (136) and the risk confidence score in block E (138).

In block F (140), the computer system 102 can generate a response friction level based on whether the impact score and/or the confidence score satisfy risk criteria. In some implementations, the computer system 102 can combine the impact score and the confidence score to generate a composite or overall risk score. The computer system 102 can then determine whether the overall risk score satisfies the risk criteria. In some implementations, only one of the impact score and the confidence score must satisfy the risk criteria for the computer system 102 to determine and generate an appropriate response friction level. For example, if the risk impact score is high because the customer 120A is shoplifting an expensive item but the risk confidence score is low because the customer 120A has not shoplifted in the past, the computer system 102 can still generate a high response friction level. This is because the retail environment 100 may have a shortage in the expensive item attributed to multiple thefts over the past several days by multiple other customers. The computer system 102 can identify the multiple thefts as part of group or organized crime and therefore may infer that the customer 120A is likely involved in the group or organized crime. Hence, the risk impact score can satisfy the risk criteria and a higher response friction level can be determined, by the computer system 102, for the activity profile of the customer 120A.

As another example, if the risk impact score is low because the customer 120A may be carrying a bat inside the retail environment 100 but the risk confidence score is high because the customer 120A has been repeatedly apprehended by local law enforcement for assault, the risk confidence score can satisfy the risk criteria and the computer system can generate a high response friction level. After all, the customer 120A likely poses a significant safety threat to the retail environment 100.

Figure 2:
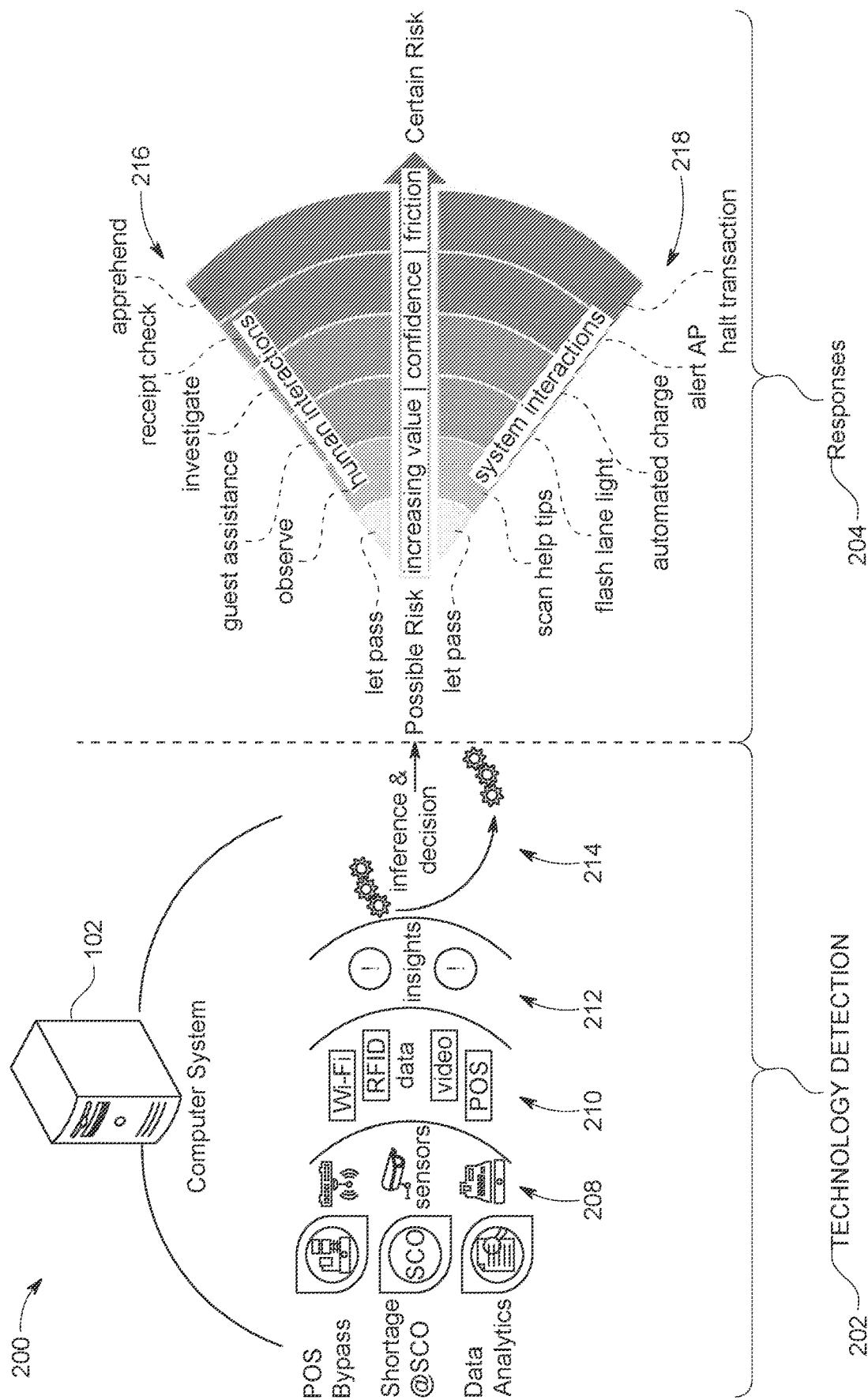
FIG. 2 illustrates an example spectrum of human and automated system responses that can be invoked based on certainty of risk associated with user activity in a retail environment.
Figure 3:
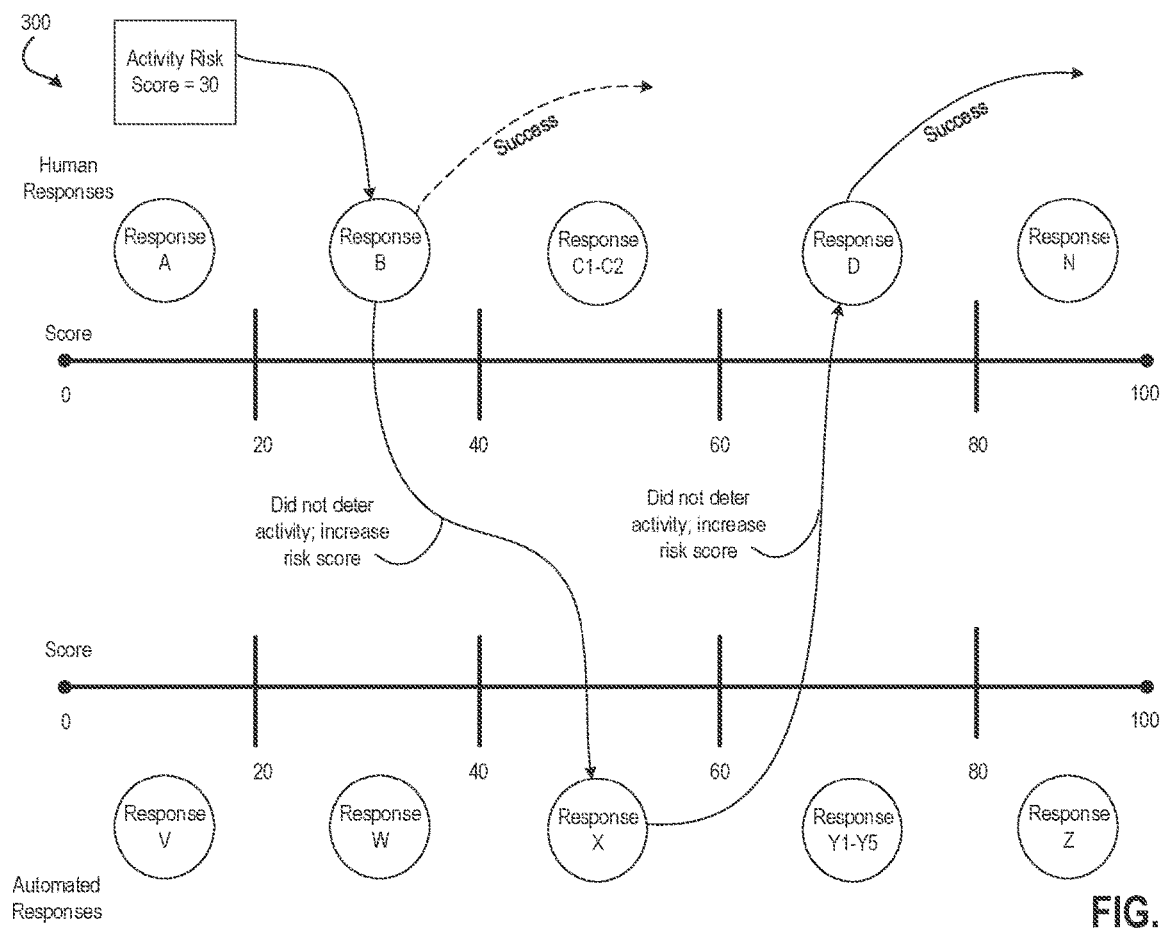
FIG. 3 illustrates an example timeline for invoking various human and/or automated system responses to user activity in a retail environment.

The higher the response friction level, the more serious the intervention or response to the customer 120A's activity. For example, a higher response friction level can be used to determine that the customer 120A should be apprehended before leaving the retail environment 100 and that their bags and/or body should be checked for shoplifted items. As another example, a lower response friction level can be used to determine that the checkout lane 106N should present a message prompting the customer 120A to rescan their item(s) before they can complete the checkout process. The response friction level can also be used to determine whether a human and/or automated system response is appropriate. Refer to FIGS. 2-3 for additional discussion about determining the intervention or response based on the response friction level.

The response friction level can be a numeric, string, and/or Boolean value. In some implementations, for example, the response friction level can be assigned a numeric value on a predetermined scale. The predetermined scale can be, for example, 0 to 1, 0 to 5, 1 to 5, 0 to 10, 1 to 10, 0 to 100, 1 to 100, etc. In some implementations, the response friction level can be a Boolean value or string value, such as low, medium, high. One or more other values can also be assigned to the response friction level in block F (140).

The computer system 102 can select a human and/or automated system response in block G (142) based on the response friction level. The computer system 102 can determine whether the type of activity in the activity profile warrants human and/or automated system responses. For example, it can be more efficient/effective to respond to petty theft by stopping the checkout process by the checkout lane 106N instead of having an employee approach the customer 120A at the checkout lane 106N and walk them through the checkout process. As another example, it can be typical/most effective to respond to potential assault by having an employee, such as security personnel, apprehend the customer 120A before they leave the retail environment 100. The computer system 102 can also determine whether sufficient labor resources are available to perform human responses before the customer 120A leaves the retail environment 100. Although described as human responses, the human responses can also be considered manual responses. For example, there may not be enough employees working the sales floor to have one oversee the customer 120A during the checkout process. Rather, it may be more labor resource efficient to save the few employees working the sales floor to respond to more serious/egregious activities, like assault or other safety risks. Refer to FIGS. 2-3 for additional discussion about the types of responses that can be selected in block G (142).

Optionally, the computer system 102 can transmit response instructions to one or more devices in the retail environment (block H, 144). For example, the computer system 102 can transmit an automated system response to the checkout lane 106N, to be executed by system components of the checkout lane 106N in real-time and/or near real-time. The computer system 102 can also transmit instructions for a human response to the in-store employee device 104, to be executed by an employee of the device 104. The instructions transmitted to the in-store employee device 104 can include a snapshot of the risky activity of the customer 120A and objective identifiers that can be used to identify the customer 120A before they leave the retail environment 100. The instructions can include necessary information useful for the employee to objectively and unbiasedly identify and stop the customer 120A at a time that the risky activity occurs or at a future time (e.g., before the customer 120A leaves the retail environment 100, a next time that the customer 120A enters the retail environment 100, etc.).

As described herein, the techniques in blocks A-H (130-144) can be performed in real-time or near real-time. As a result, actions can be taken against the risky activities of the customer 120A (and other customers in the retail environment 100) as such activities occur. By doing so, the risky activities can be stopped. Performing the disclosed techniques in real-time or near real-time can also be beneficial to deter or otherwise prevent future risky activities from occurring in the retail environment, regardless of whether those activities are related to shortage events or security/safety events.

Figure 1B:
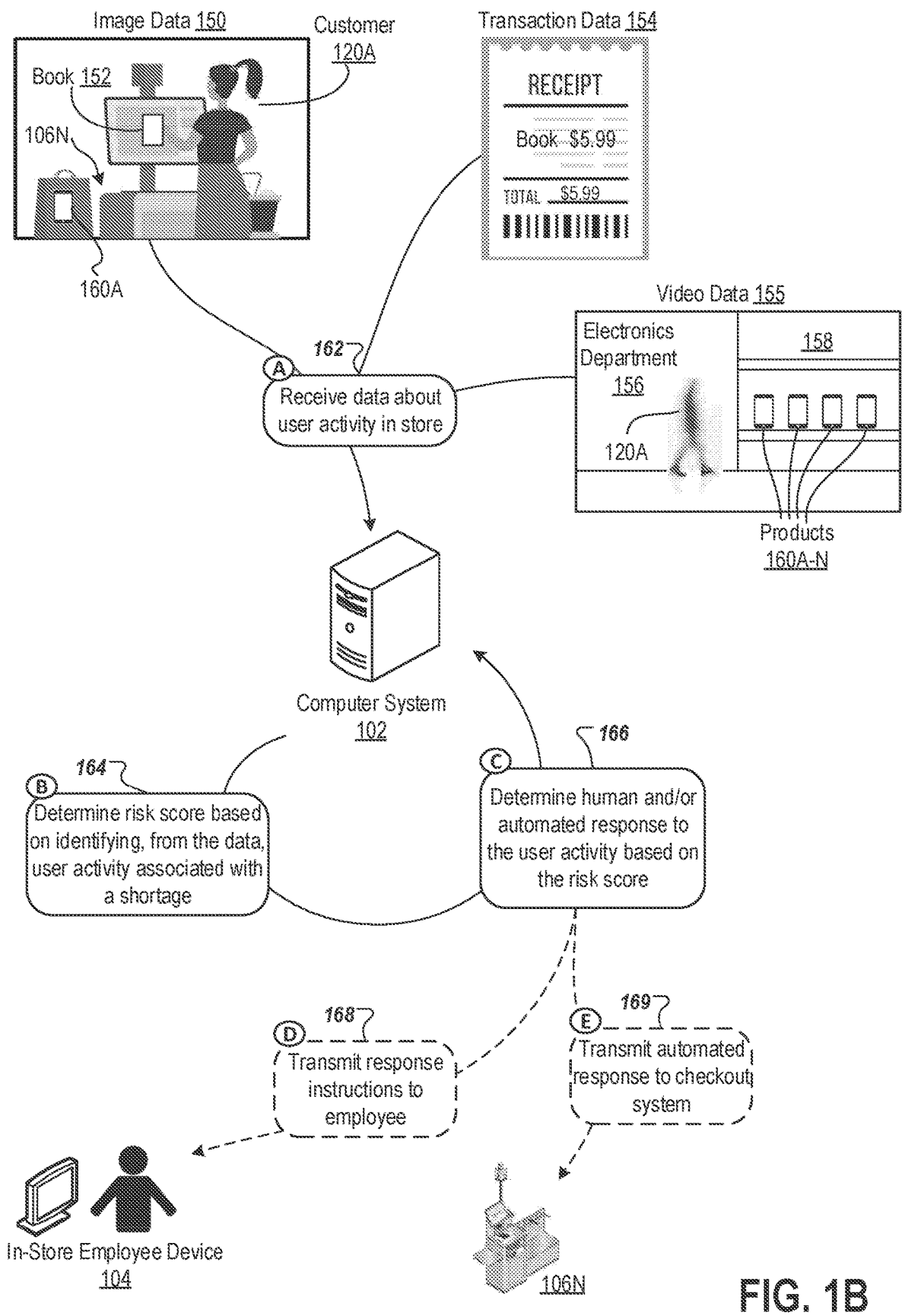
FIG. 1B is a conceptual diagram for determining a human and/or automated system response to user activity likely attributed to a shortage in a retail environment.

FIG. 1B is a conceptual diagram for determining a human and/or automated system response to user activity likely attributed to a shortage in a store (e.g., retail environment). In the illustrative example of FIG. 1B, the customer 120A can be performing a checkout process at the checkout lane 106N in which they scan a book 152 instead of a cellphone 160A. The cellphone 160A can already be placed in the customer 120A's bags, which the customer 120A might have done while walking through the store. For example, the customer 120A might have walked through an electronics department 156 in the store, swiped the cellphone 160A off a shelf 158, and stashed the cellphone 160A in a bag before continuing with their trip in the store. During checkout, the customer 120A scans the book 152 instead of the cellphone 160A so that the customer 120A pays for only the book 152 and shoplifts the cellphone 160A. The customer 120A is engaging in shoplifting, which can be determined and responded to based on the techniques described herein.

The computer system 102 can receive data about the user activity in the store in block A (162). The data can include image data 150, transaction data 154, and/or video data 155. One or more other types of data can be received from devices and/or systems throughout the store, such as RFID signals from RFID readers and location-based signals of a mobile device of the customer 120A from location-based signaling devices. Refer to FIG. 1A for additional discussion about other types of data and/or system-generated inferences that can be received in block A (162) and used to perform the techniques described herein.

Here, the image data 150 can be captured by a camera at or near the checkout lane 106N. The image data 150 can show the customer 120A performing the checkout process at the checkout lane 106N. In particular, the image data 150 shows the customer 120A scanning the book 152 at the checkout lane 106N.

The transaction data 154 can be a receipt indicating what products were/are scanned by the customer 120A at the checkout lane 106N and how much each of those products cost. The transaction data 154 can also include other information, including but not limited to customer account information (e.g., username, email, password), credit card information, mobile wallet information, and/or other payment information.

The video data 155 can show the customer 120A walking quickly past the shelf 158 holding the cellphones 160A-N in the electronics department 156. The video data 155 can show that the customer 120A is making some quick, blurred actions near the cellphones 160A-N.

The data 150, 154, and 155 can be received by the computer system 102 and aggregated to determine an activity profile of the customer 120A, as described in reference to FIG. 1A. For example, in combination, the image data 150, the transaction data 154, and the video data 155 can indicate that the customer 120A rushed past the electronics department 156 in an attempt to shoplift the cellphone 160A and scanned the book 152 instead of the cellphone 160A at the checkout lane 106N, which was reflected as the only product purchased on the transaction data 154. Therefore, as a combination of disparate data, the computer system 102 can determine that the customer 120A likely is engaging in risky activity in the store and a severity of that activity, which can then be used to determine a type of response to be performed.

In block B (164), the computer system 102 can determine a risk score based on identifying, from the data, user activity associated with a shortage. For example, the computer system 102 can aggregate and analyze the data. The computer system 102 can also determine a risk impact score and/or a risk confidence score based on the aggregated and analyzed data, as described in reference to FIG. 1A. The risk score can, for example, be a combination of the risk impact score and the risk confidence score.

The risk score can be determined based on identifying that the customer 120A likely shoplifted the cellphone 160A in the video data 155, but only scanned the book 152 during the checkout process, as shown by the image data 150 and the transaction data 154. Moreover, the risk score can be determined based on identifying that the book 152 only cost $5.99 (see the transaction data 154) but the customer 120A shoplifted the cellphone 160A, which is worth $300. Since the cost of the shoplifted cellphone 160A may exceed some threshold cost value, the computer system 102 can determine a high risk score. The computer system 102 can also determine that the customer 120A is involved in a shortage and assign a high risk score based on analyzing the customer 120A's actions in the video data 155. For example, the computer system 102 can identify aggressive posture (e.g., hunched shoulders, looking back and forth down the aisle, etc.) and fast movements of the customer 120A around the shelf 158 in the video data 155. These identifications can indicate a higher likelihood or confidence that the customer 120A is engaging in risky activity, like a shortage. Accordingly, the computer system 102 can assign a high risk score (e.g., a risk score about a threshold score value).

In block C (166), the computer system 102 can determine a human and/or automated response to the user activity based on the risk score. Part of determining the appropriate response can include determining a response friction level, as described in reference to FIG. 1A. For example, the higher the risk score, the higher the response friction level. The higher the response friction level, the more serious action can be taken in response to the user activity that is detected. In block C, the computer system 102 can also determine whether a human response is more appropriate than an automated system response and vice versa, as described herein and in reference to FIG. 1A.

The computer system 102 can optionally transmit response instructions to the in-store employee device 104 of an employee in the store (block D, 168) (e.g., assuming the computer system 102 determines that a human response is warranted and should be performed in block C).

The computer system 102 can optionally transmit an automated system response to the checkout lane 106N system in block E (169) (e.g., assuming the computer system 102 determines that an automated system response is warranted and should be performed in block C).

Figure 1C:
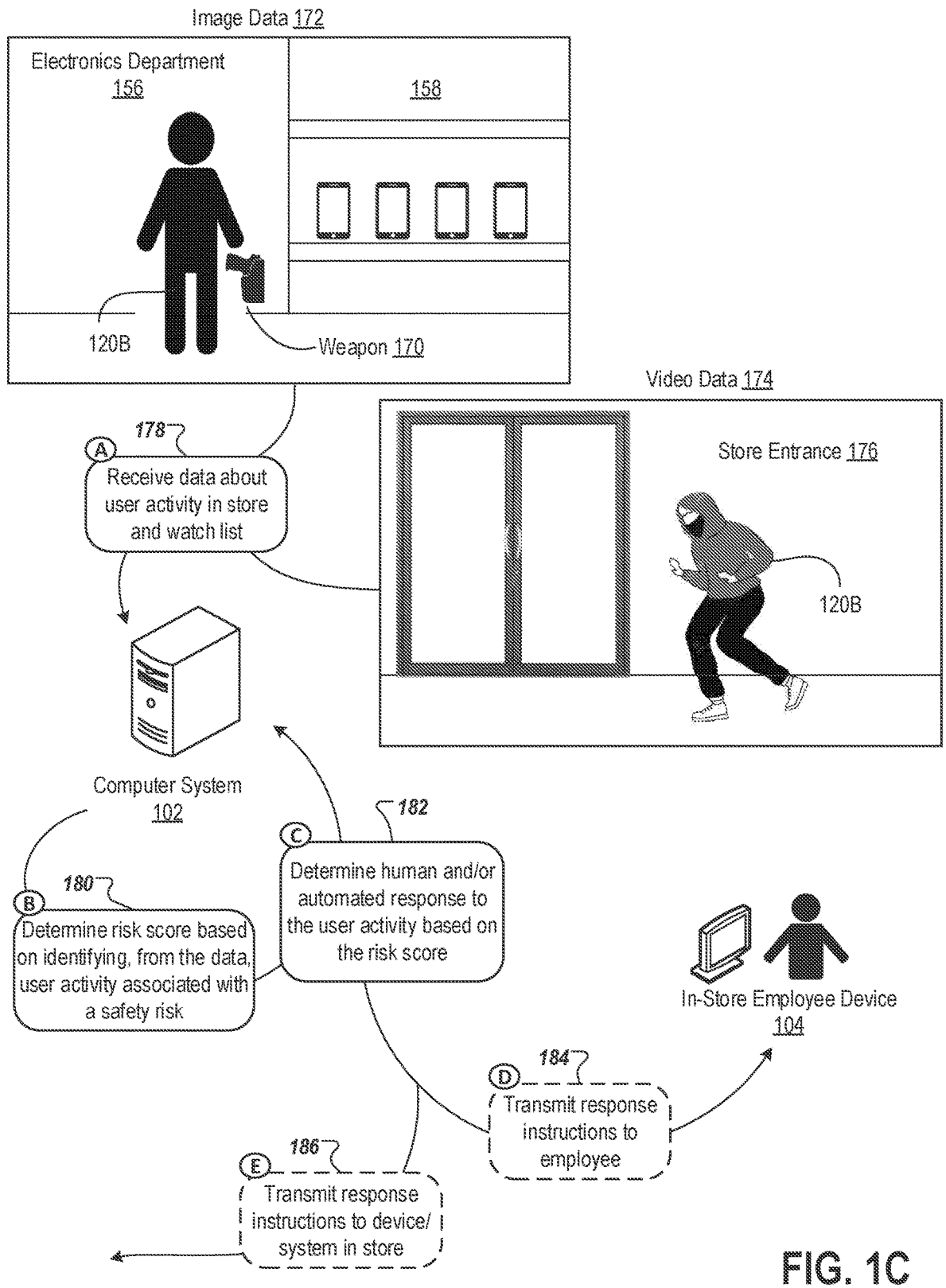
FIG. 1C is a conceptual diagram for determining a human and/or automated system response to user activity likely attributed to a safety risk in a retail environment.

FIG. 1C is a conceptual diagram for determining a human and/or automated system response to user activity likely attributed to a safety risk in a store (e.g., retail environment). In this illustrative example, image data 172 captures a customer 120B in the electronics department 156 seemingly carrying a weapon 170. Video data 174 depicts the same customer 120B suspiciously exiting the store via store entrance 176. In combination, the image data 172 and the video data 174 can indicate that the customer 120B poses some security threat to the store.

The computer system 102 can receive data about the user activity in the store in block A (178). As described throughout this disclosure, the data can include a variety of data types from a variety of data sources, devices, and/or systems (e.g., refer to FIG. 1A). Some of the data received in block A (178) can include the image data 172 and the video data 174. The image data 172 and the video data 174 can be associated with the customer 120B using objective identifiers, as described in FIG. 1A. As another example, the image data 172 and the video data 174 can be associated with the customer 120B based on identifying objective visual features of the customer 120B that appear in both data 172 and 174 (e.g., color of a sweater, posture, movements, hair color, hat, shoes, jacket, etc.).

In block A (178), the computer system 102 can also receive a watch list for the store. The watch list can be used to determine whether the customer 120B poses a significant safety/security threat to the store. This determination can then be used by the computer system 102 to determine an appropriate real-time or near real-time response to the customer 120B's activities. The watch list can be retrieved from a data store. In some implementations, the computer system 102 can already have access to the watch list in local memory/storage. The watch list can indicate one or more customers, via objective identifiers, that have been identified or associated with suspicious activity in the store over some predetermined period of time (e.g., a past day, a past 3 days, a past 5 days, a past week, a past 2 weeks, a past month, etc.). The watch list can rank customers based on the type of suspicious activity they are associated with and/or the severity of their activities. The more egregious the activity (e.g., assaulting customers and/or employees in the store multiple times in the past), the higher the customer may be ranked in the watch list. The watch list can also be updated on a daily basis or other predetermined basis. Whenever the watch list is updated, the computer system 102 can receive the updated watch list.

In block B (180), the computer system 102 can determine a risk score based on identifying, from the data, user activity associated with a safety risk. As described in FIG. 1B, the risk score can be determined based on determining a risk impact score and a risk confidence score. The risk score can be determined based on identifying a potential safety risk from a combination of the image data 172 and the video data 174 (and any other data that may be received by the computer system 102 and associated with the customer 120B). The safety risk can be heightened based on identifying the particular customer 120B on the watch list for the store. For example, the computer system 102 can determine whether the customer 120B appears on the watch list using one or more objective identifiers attributed to the customer 120B. The objective identifiers can include payment information (e.g., credit card information, mobile wallet information, user account information, MAC address, email, phone number, etc.) received at a checkout lane when the customer 120B is performing a checkout process before leaving the store. The computer system 102 can determine whether any of the received objective identifiers appear on the watch list, thereby indicating that the customer 120B has been flagged as a potential threat to the store. Similarly, the computer system 102 can determine the risk score based on identifying a likelihood that the user activity of the customer 120B is attributed to a safety risk, such as personal or physical harm. The image data 172 and/or the video data 174 can be analyzed to identify aggressive actions and posture of the customer 120B and/or positive identification of the weapon 170.

The computer system 102 can employ one or more machine learning trained models to analyze the data 172 and/or 174 and identify/extract features indicative of safety risks. For example, the computer system 102 can use a model with object detection techniques to identify one or more different types of weapons from image and/or video data. The computer system 102 can also use a model to objectively identify the customer 120B across various different data types. As another example, the computer system 102 can use a model to identify and classify the customer 120B's actions. Classifying the customer 120B's actions can include identifying and labeling some actions as typical (e.g., picking a product off a shelf at a constant pace) and other actions as atypical (e.g., running down an aisle, fast/blurred movements near a shelf, pacing, hunched over shoulders, looking back and forth up and down an aisle, etc.). Determinations and classifications made by the computer system 102 can be scored with confidence values that can indicate likelihood that the customer 120B is associated with a safety risk in the store. Although the techniques described in reference to block B (180) in FIG. 1C are described in the example of a safety risk use case, these techniques can also be used in the example of a shortage use case (see FIG. 1B) or other use cases described herein. Moreover, any other techniques that are used for identifying safety risks or shortage events can be used by the computer system 102 in bock B (180).

The computer system 102 can determine a human and/or automated system response to the user activity based on the risk score in block C (182). As described further in reference to FIG. 1B, the response can be determined based on assigning a response friction level to the user activity. The response friction level can be assigned a value based on a risk impact and/or confidence that the customer 120B is engaging in a safety risk. The higher confidence, for example, that the customer 120B has the weapon 170 on their body while in the store, the higher the response friction level and the more serious the response that is determined in block C (182). The response friction level and/or the risk score can also be used by the computer system 102 to determine whether to invoke a human and/or automated system response, as described in reference to FIGS. 1A-B.

Optionally, the computer system 102 can transmit response instructions to the in-store employee device 104 of an employee (block D, 184), assuming the computer system 102 determined that a human response is warranted in block C (182). Optionally, the computer system 102 can transmit response instructions to a system or device in the store (block E, 186), assuming the computer system 102 determined that an automated system response is warranted. Refer to FIGS. 1A-B for further discussion.

FIG. 2 illustrates an example spectrum of human and automated system responses (216 and 218, respectively) that can be invoked based on certainty of risk associated with user activity in a retail environment. A process 200 can be performed by the computer system 102 to assess user activity in the retail environment and determine an appropriate response to the activity in real-time and/or near real-time. The process 200 can begin with detections made by devices, systems, or other technology in the retail environment (202). For example, sensors 208 in the retail environment can collect data 210, which can be used by the computer system 102 (or one or more of the sensors 208) to generate insights 212 about user activity in the retail environment and corresponding inferences and decisions 214 about likelihood that the user is engaging in risky activity.

The sensors 208 can include any of the devices and systems described herein, including but not limited to point-of-sale (POS) terminals in checkout lanes, cameras, RFID readers, location-based signaling devices, scanning devices, etc. The sensors 208 can detect and collect data 210 of various different types, including but not limited to WIFI signals, RFID signals, video data, image data, transaction data, location data, GPS signals, etc. Such seemingly disparate data can be aggregated and analyzed by the computer system 102 to generate the insights 212. For example, the computer system 102 can use objective identifiers to associate any of the data 210 with a particular customer (e.g., user) in the retail environment (thereby creating an activity profile, as described in reference to FIG. 1A). The computer system 102 can also generate insights 212 based on analyzing the aggregated data, such as identifying user activity most likely associated with swapping barcodes, shoplifting, causing harm to other customers, etc. The computer system 102 can accordingly make inferences and/or decisions as to whether the customer associated with the user activity is engaging in risky activity and a severity of that risky activity. The severity of the risky activity can be used to determine a response friction level, as described in reference to FIGS. 1A-C.

Accordingly, the computer system 102 can determine responses 204, which include human responses 216 (e.g., manual responses) and/or automated system responses 218, based on the inferences and decisions 214. The human responses 216 and the automated system responses 218 can become more severe/serious as the response friction level increased. In other words, if the computer system 102 infers that the customer is engaged in possibly risky activity (e.g., it is 50% certain that the customer shoplifted an item over a threshold value amount), the computer system 102 can determine a less severe human response 216 or automated system response 218 to that activity. As the possibility that the customer is engaging in risky activity increases to certain risky activity, the human response 216 and/or automated system response 218 that is generated and selected can become more severe. For example, as described herein, the computer system 102 can determine that the user activity escalates from possible risk to certain risk based on risk criteria such as increasing value of items involved in a shortage event attributed to the customer, increasing confidence that the customer is engaging in a shortage event or security event, and/or increasing confidence that the customer has engaged in similar risky activities in the past. One or more other criteria can also be used to determine a severity of the risky activity of the customer and whether to apply more friction (and thus a more severe response) in responding to the customer's activity.

As shown in FIG. 2, the human responses 216 are depicted in increasing severity from possible risk to certain risk. If the computer system 102 determines possible risk for the particular customer's activity, the computer system 102 may simply select the human response 216 to let the activity pass—in other words, an employee in the retail environment may not be instructed/prompted to intervene. The next level/tier of the human responses 216 can include observing the customer. For example, the computer system 102 can generate instructions for an employee to observe video footage of the customer in real-time as the customer is performing a checkout process. The employee can be tasked with determining whether the customer performs any suspicious activities during the checkout process. The next level of the human responses 216 can be providing guest assistance, in which the computer system 102 can generate instructions prompting an employee to approach the customer during the current checkout process and assist them in completing the checkout process.

As the computer system 102 determines greater certainty/confidence that the customer is engaging in risky activity (e.g., a shortage event and/or a safety/security event), the computer system 102 can select more severe human responses 216, such as investigation. The computer system 102 can generate instructions prompting an employee to review a case file of data depicting the customer's activities over time to investigate whether the customer is engaging in risky activity. Other investigation instructions can also be generated and transmitted to a device of one or more employees in the retail environment.

As the certainty/confidence that the customer is engaging in risky activity continues to increase, the computer system 102 can generate the human response 216 of performing a receipt check. Instructions can be transmitted to the device of an employee, prompting the employee to approach the customer after the checkout process and check their receipt against contents of their bags. This type of intervention/response can be performed in response to determining that the customer likely did shoplift product(s) and/or likely did shoplift products exceeding some threshold cost value.

Once the computer system 102 is most certain (or within some threshold level of certainty) that the customer is engaging in risky activity, the computer system 102 can select a human automated response 216 that has the highest friction level: apprehending the customer. The computer system 102 can generate instructions that prompt an employee to approach the customer before they leave the retail environment and apprehend them. This can be considered a most severe response to customer activity that is selected when the computer system 102 is most certain the customer is engaging in risky activity and/or the risky activity is most serious/egregious. In some implementations, the most sever response to the customer's risky activity can include calling or otherwise contacting law enforcement to intervene.

As described herein, the computer system 102 can determine a risk score associated with the customer's risky activity. Each of the responses 216 and/or 218 can be assigned a range of values along a scale for the risk score. To determine which response to select in the spectrum (whether human response 216 or automated system response 218), the computer system 102 can determine which range of values the risk score associated with the customer's risky activity falls within. For example, the first, least severe human response 216 of letting the activity pass can be associated with a range of 0 to 10 for the risk score. On the other hand, the most severe human response 216 of apprehending the customer can be associated with a range of 90 to 100 for the risk score. If the customer's activity has a risk score of 8, for example, and the computer system 102 determines that a human response 216 should be made (discussed further below), the computer system 102 can select the human response 216 of letting the activity pass. On the other hand, if the customer's activity has a risk score of 99 and the computer system 102 determines that a human response 216 should be made, the computer system 102 can select the human response 216 of apprehending the customer.

Still referring to FIG. 2, the automated system responses 218 are depicted in increasing severity from possible risk to certain risk. For example, the less severe the risk (e.g., possible risk), the computer system 102 can select a response 218 such as letting the activity pass. The next level/tier of automated system response 218 can include sending help tips to be presented at a POS terminal of the checkout lane where the customer is completing the checkout process. The next level/tier of response 218 can include flashing a lane light at the checkout lane, which can provide an indication/warning to one or more employees near the checkout lane. The next level/tier of response 218 as the risk certainty increases can be performing an automated charge. As an illustrative example, if the computer system 102 has a confidence above a threshold value that the customer will be leaving with something they did not pay for and the computer system 102 has objective identifiers linking the customer to an online account or payment information, the computer system 102 can impose a charge for the item on the customer's account. Therefore, the customer would be charged the cost of the item that they are leaving the store with. In some implementations, the threshold value can be a 100% confidence. As other examples, the threshold value can be 90%, 95%, 99%, etc. The next level/tier of response 218 can be alerting safety and security personnel in the store. The safety and security personnel in the store can then review the alert and respond to the alert, which can be a considered a human or manual response. A most severe automated system response 218 for a highest certainty of risky activity can include halting the transaction of the customer. For example, the computer system 102 can generate instructions that cause the POS terminal at the checkout lane to prevent the customer from scanning any more products and/or prevent the customer from completing the transaction by providing payment information. As described in reference to the human responses 216, the computer system 102 can select an appropriate automated system response 218 based on a risk score assigned to the customer's activity and a range of values for the risk score that correspond to each automated system response 218.

One or more other human responses 216 and/or automated system responses 218 can be generated and selected by the computer system 102 along the spectrum of responses and for different levels of certainty/confidence in the risky activity. Moreover, the types of responses 216 and/or 218 that can be selected can vary depending on the type of risky activity. Shortage events, for example, may warrant certain types of responses (e.g., guest assistance, receipt check, etc.) and security events may warrant other types of responses (e.g., observe, investigate, apprehend, etc.).

The computer system 102 can select human responses 216 or automated system responses 218 but not both (e.g., it can be more labor efficient to respond to a possible risk, such as petty theft, by flashing the lane light of the checkout lane instead of having an employee provide guest assistance to the customer at the checkout lane). Therefore, the human responses 216 and the automated system responses 218 can be invoked without relying on each other. In some implementations, the computer system 102 can select both human responses 216 and automated system responses 218 (e.g., a most severe or most risky activity may warrant both halting the transaction as the automated system response 218 and apprehending the customer as the human response 216).

The computer system 102 can also compound one or more human responses 216 and/or automated system responses 218 over time, based on continuous assessment of the customer's activity. Moreover, the computer system 102 can compound one or more responses to then warrant more severe responses to the customer's activity. For example, the computer system 102 may decide that the customer is almost certainly engaging in shoplifting, but may not select the human response 216 of apprehending the customer until an employee first observes the activity of the customer. Therefore, if the employee observes the activity of the customer and determines that the customer is acting suspicious, the computer system 102 can then compound the human responses 216 and escalate the human responses 216 by instructing the employee to apprehend the customer next.

The computer system 102 can also determine whether a human response 216 or an automated system response 218 is warranted based on analysis of the customer's activity (e.g., based on the insights 212 and/or the inference and decisions 214 described above). This determination can also be made based on available resources in the store. For example, if the store does not have sufficient labor resources (e.g., only a few employees are working on the sales floor and having one of the employees leave their post/task to deal with the customer may not be an efficient use of the available labor resources), the computer system 102 can determine that an automated system response 218 should be selected. On the other hand, if the computer system 102 determines that the customer is likely engaging in activity that typically warrants human intervention (e.g., the customer shoved another customer and caused harm to the other customer), the computer system 102 can select a human response 216 instead of an automated system response 218. As yet another example, it can take a significant amount of time to apprehend a customer and document their case, regardless of whether the customer has posed a continuous threat to the store as part of an organized crime or the customer has stolen a $5 lipstick once. Therefore, the computer system 102 can determine that it is more efficient use of labor resources to apprehend and document the customer likely associated with organized crime and let pass the customer who stole the $5 lipstick.

Therefore, when choosing whether to select a human response 216 or an automated system response 218, the computer system 102 can (1) check whether an employee is nearby to respond, (2) whether sufficient labor resources are available to effectively and efficiently response to the customer's activity, and/or (3) whether the customer's activity is one that typically is responded to by a human rather than a system. One or more other factors can be used to determine whether to select the human response 216 or the automated system response 218, such as: cost of available labor resources, value of products involved in the customer's activity, type of products involved in the customer's activity, whether an automated system response 218 is a better response/more efficient/etc., whether the store is suffering from loss of the product involved in the customer's activity since this product has been stolen many times by other customers, trends in theft/security issues in the particular store and/or a network of stores, and/or organized crime that the customer may be associated with.

The purpose of the process 200 is to select a human response 216 and/or automated system response 218 that can be effective in deterring current risks/threats as well as future behavior, such as organized crime. The process 200 can also be performed to efficiently use labor resources in such a way that has a positive impact on stopping current risky activity and preventing future risky activity.

FIG. 3 illustrates an example timeline 300 for invoking various human and/or automated system responses to user activity in a retail environment. In the example of FIG. 3, human responses can include responses A, B, C1, C2, D, and N. Automated system responses can include responses V, W, X, Y1-Y5, and Z. Each of the responses can indicate a different type of response (or a dimension of responses) based on severity of the customer's activity. For example, human response A and automated response V can correspond to a least severe customer activity (e.g., possibly risky activity, least risky activity, etc. On the other hand, the human response N and the automated response Z can correspond to a most severe customer activity (e.g., highest certainty of risky activity, most risky activity, etc.).

Determining which of the human responses and/or automated responses to select in response to the customer activity can be based on a risk score assigned to that activity. Refer to FIGS. 1A-C for additional description about determining and assigning the risk score. The risk score can therefore indicate which response or responses should be implemented.

For example, human response A (or multiple human responses that are grouped under the dimension of response A) can be selected if the customer's activity risk score is between 0 and 20. Human response B can be selected if the customer's activity risk score is between 20 and 40. Human responses C1-C2 can be selected if the customer's activity risk score is between 40 and 60. Human response D can be selected if the risk score is between 60 and 80. Human response N can be selected if the risk score is between 80 and 100. One or more other ranges of values can be used and associated with each of the human responses A-N. For example, human response A can be selected if the activity risk score is between 0 and 10, human response D can be selected if the risk score is between 50 and 95, and human response N can be selected if the risk score is between 95 and 100. The human responses A-N can also be assigned various other ranges of risk score values.

In some implementations, each of the human responses A-N can correspond to one or more of the human responses 216 in FIG. 2. For example, human response A can include letting the activity pass. Human response B can include observing the activity. Human responses C1-C2 can include guest assistance and investigation. Human response D can include receipt check, and human response N can include apprehending the customer.

As another example, automated response V can be selected if the customer's activity risk score is between 0 and 20. Automated response W can be selected if the customer's activity risk score is between 20 and 40. The response X can be selected if the risk score is between 40 and 60. Automated responses Y1-Y5 can be selected if the risk score is between 60 and 80. Response Z can be selected if the risk score is between 80 and 100. As described above in reference to the human responses, each of the automated responses V-Z can correspond to one or more different types of automated system responses. The score ranges for the automated responses V-Z can also vary, be the same, or different across the automated responses V-Z and/or in relation to the human responses A-N. Therefore, the ranges of risk score that correspond to different types of automated responses can be different than the ranges of risk score that correspond to different types of human responses.

In some implementations, each of the automated responses V-Z can correspond to one or more of the automated system responses 218 in FIG. 2. For example, automated response V can include at least letting the activity pass. Response W can include sending help tips to the customer at the checkout lane. Response X can include flashing the lane light at the customer's checkout lane. Responses Y1-Y5 can include automating a charge and/or alerting security and safety personnel. Moreover, response Z can include halting the transaction. One or more other variations of human and automated system responses can be determined.

When a response fails to have an intended effect, such as stopping or otherwise deterring/preventing the customer's activity, the computer system can escalate to a more serious response. In some implementations, as described herein, the computer system can only select human responses or only select automated system responses. In some implementations, as shown in the example of FIG. 3, the computer system can select a combination of both human and automated system responses.

Here, the customer's activity risk score is 30/100. Because the risk score falls between the range of 20 to 40, the computer system can select human response B to respond to the customer's activity. For example, the human response B can include a variety of responses that can be applied to activity having a risk score between 20 and 40. The computer system can select a human response of observing the customer, which can be one of the human responses B. If the selected human response B is a success and thus prevents or stops the customer's risk activity, then the computer system may not select another response to be applied. On the other hand, if the human response B does not work (e.g., does not deter the customer's activity), the computer system can resort to an escalated response. For example, the computer system can select one or more of the human responses C1-C2, D, and/or N. The computer system can also select one or more of the automated system responses V-Z. Optionally, the computer system can also increase the risk score.

Here, the human response B did not succeed in stopping the customer's activity (e.g., the customer continues scanning products during the checkout process and it is uncertain whether the customer is scanning the correct products). Thus, the computer system increases the risk score and escalates the response to automated system response X. The automated system response X can include, for example, flashing the lane light to bring attention of employees to the customer's checkout lane. In some implementations, the computer system may not escalate to any of the human responses C1-C2 because the computer system can determine that the store has limited available labor resources. Therefore, to efficiently use the available labor resources, the computer system can select an automated response.

In this example, the response X may not succeed in stopping the customer's shoplifting. Therefore, the computer system increases the risk score and escalates the response by selecting human response D. Human response D can, for example, include having an employee check the customer's receipt once they complete the checkout process. At this point, when the employee checks the customer's receipt against the contents of their bags, the employee can discover that the customer has shoplifted. Therefore, the human response D was successful in stopping the shoplifting. Even if the store has limited available labor resources, the computer system may determine that human intervention is the appropriate way to escalate the response since automated responses may not be sufficient (e.g., automating a charge may not prevent or stop the customer from attempting to shoplift other products during the checkout process).

Figure 4A:
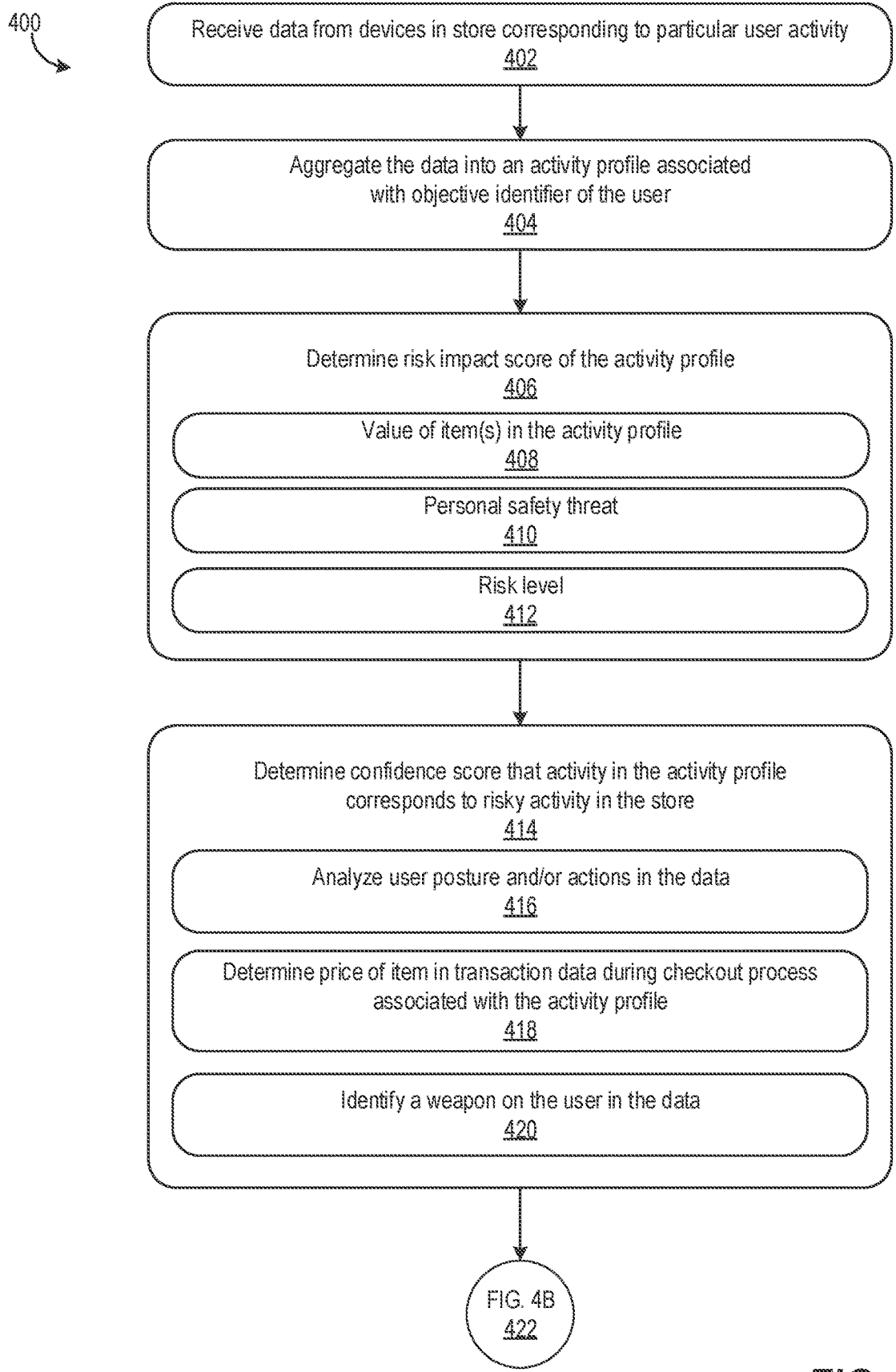
FIGS. 4A-B is a flowchart of a process for determining a response friction level to be used in determining an appropriate response to user activity in a retail environment.
Figure 4B:
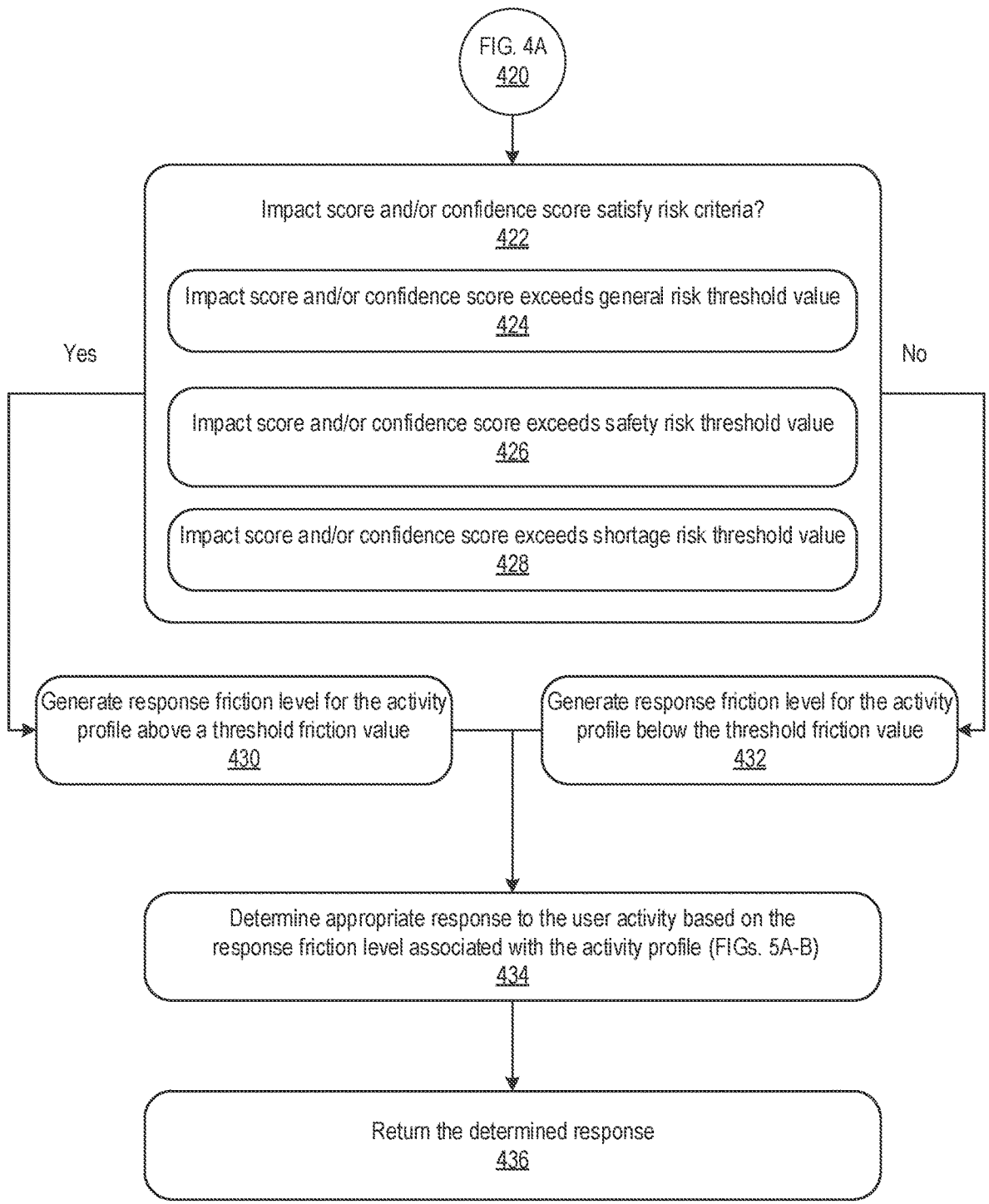

FIGS. 4A-B is a flowchart of a process 400 for determining a response friction level to be used in determining an appropriate response to user activity in a retail environment. The response friction level can be determined based on analyzing data from devices in the retail environment that has been objectively attributed to a customer in the retail environment. The data can be analyzed to determine a risk impact score and a confidence score that the customer is likely engaging in risky activity that warrants some response/intervention before they leave the retail environment. The response friction level can be an aggregation or other combination of the risk impact score and the confidence score. The higher the response friction level, the more escalated a response may be to the customer. In other words, the higher response friction level can indicate that the customer is likely engaging in serious risky activity (e.g., the customer is shoplifting a smartphone that costs $1,000 and the customer has shoplifted in the past) that warrants an immediate and more escalated response (e.g., human or manual response and/or automated system response) than a less serious risky activity (e.g., the customer is shoplifting a pack of cookies that costs $3.99 and the customer has not shoplifted in the past).

The process 400 can be performed by the computer system 102. The process 400 can also be performed by one or more other computing systems, devices, computers, networks, cloud-based systems, and/or cloud-based services. For illustrative purposes, the process 400 is described from the perspective of a computer system.

Referring to the process 400 in both FIGS. 4A-B, the computer system can receive data from devices in a store (e.g., retail environment) that corresponds to particular user activity (block 402). As described in reference to FIGS. 1A-C, the computer system can receive seemingly disparate data such as image data, RFID readings, location-based signals, and/or transaction information from devices in the store, such as cameras, RFID readers, location-based signaling devices, and/or POS terminals in checkout lanes. The computer system can receive such data continuously (e.g., as it is collected/detected). The computer system can also receive such data at predetermined time intervals (e.g., every 1 minute, every 5 minutes, every 10 minutes, every 30 minutes, every 1 hour, every 5 hours, every 10 hours, every 24 hours, etc.). The computer system can request data from monitoring devices in the store that correspond to a particular known objective identifier for the user. For example, the computer system can request data from monitoring devices that identify wireless signals associated with the user who was previously known to be a threat. Such wireless signals can include but are not limited to a MAC address. As another example, the computer system can request and receive data from monitoring devices in high-risk and/or high-dollar areas in the store in which those monitoring devices identify a threshold amount of location and/or product scanning activity associated with the user's mobile device and/or mobile application that is accessed at the user's device and linked to a user account with the store.

In block 404, the computer system can aggregate the data into an activity profile associated with an objective identifier of the customer. The computer system can associate user activity in the received data to a customer or customer using objective identifiers. The objective identifiers can include user account information, credit card information, other payment information, phone number, email address, clothing, body movement/mannerisms, and other features identified using object detection techniques. Although the process 400 is described in reference to a store, the process 400 can apply to any type of retail environment or other location public location where customers may purchase products, such as a mall. Therefore, transaction data that includes a same address or user account information can be associated with the particular customer having that address or user account information. Image data showing the customer in a same blue sweater in different locations in the store, including the checkout lane, can also be associated together with the transaction data into the activity profile for the particular customer.

The computer system can determine a risk impact score of the activity profile in block 406. The block 406 can be based on a variety of factors and/or conditions, including but not limited to a value of items associated with the activity profile (block 408), presence of a personal safety threat in the activity profile (block 410), and/or risk level (block 412). The risk impact score can be a numeric value that is determined based on one or more factors. For example, the risk impact score can be determined based on the cost of products involved in the customer's activity (block 408). If the customer is shoplifting products that exceed some threshold cost value, the computer system can assign a high risk impact score (e.g., a score above a threshold score value). On the other hand, if the customer is shoplifting a product that is less than some threshold cost value (e.g., the customer is shoplifting a book or several packs of gum), then the risk impact score can be assigned a low value. The risk impact score can therefore be a score value indicating an impact that the customer's activity may have on the store. The greater the impact of that activity, the higher the risk impact score.

As another example, the risk impact score can be determined based on a physical risk to others in the store (block 410). If the customer's activity exhibits signs of violence, harm, and/or fear (e.g., the customer is hunched over in image data with a weapon seemingly visible under their shirt), the computer system can assign a high risk impact score. After all, the customer's activity may have a big impact on the overall safety and security of the store.

As yet another example, the risk impact score can be determined based on a risk of theft (block 412). If the customer's activity most likely exhibits signs of theft (e.g., the customer is rushing through one or more aisles, their location is identified in an electronics department for a threshold amount of time but the transaction data indicates that the customer only purchased a book from the next aisle over, etc.), then the computer system can assign a high risk impact score. The high risk impact score indicates that the customer's activity may have a big impact on shortages in the store.

In block 414, the computer system can determine a confidence score that the activity in the activity profile corresponds to risky activity in the store. The risky activity can include theft or shoplifting, which is part of a shortage event in the store. The risky activity can include safety and/or security events, such as physical harm, bodily harm, fear, terror, threats, and other types of safety and/or security events. The computer system can apply one or more machine learning trained models to the activity in the activity profile to identify and classify the activity. The activity can be classified as one or more types of activities, including various different types of risky activities as well as non-risky activity. The models can be trained for example, to identify one or more features in the activity that correspond to one or more types of activities, then label the features as such.

As an illustrative example, a model can be trained to process transaction data in combination with image data of at least a checkout lane in the store. The model can correlate items recorded in the transaction data with items appearing in the image data during the checkout process. The model can then be trained to identify if any items appear in the image data that do not match items recorded in the transaction data. Identifying such items that do not appear in the image data can cause the model to generate output indicating a likelihood of theft/shoplifting during the checkout process. Accordingly, the model can generate a confidence score above a threshold value, the confidence score indicating a high likelihood that the activity in the activity profile corresponds to a shortage event in the store.

As another illustrative example, a model can be trained to process image data of the customer moving throughout the store and determine a likelihood that the customer poses a security threat to the store. The model can be trained to identify actions or bodily movements made by the customer that are likely associated with security or safety threats. For example, the model can be trained to identify and label aggressive posturing, rapid movement in and around aisles or near shelves, turning their head back and forth/up and down an aisle, etc. As another example, the model can be trained to identify and label weapons and actions likely attributed to safety and security threats (e.g., running in the store, pushing or shoving someone, aggressively bumping into someone, punching someone, tripping someone, etc.).

The models can be trained with training data sets that include data collected by the devices in the store, as described herein. The training data sets can also include data collected by devices at one or more other stores in a network of stores. Moreover, the training data sets can include data that has been labeled by humans and/or data that has been labeled automatically by the computer system or other computing systems.

The models can generate, as output, confidence scores for the activity profile indicating likelihood or confidence that the activity in the activity profile is in fact risky activity. The confidence score can be a float value from 0 to 1. The confidence score can also be a numeric value on a predetermined scale, including but not limited to 0 to 5, 0 to 10, 0 to 50, 0 to 100, 1 to 5, 1 to 10, 1 to 50, 1 to 100, etc. In some implementations, the confidence score can also be percentage indicating likelihood/certainty that the activity is risky activity (e.g., 50% certain the activity is risky, 100% certain the activity is risky, etc.). A higher confidence score can indicate a higher confidence or likelihood that the activity in the activity profile is associated with a risky activity, such as a shortage or safety/security event. A higher confidence score can be assigned to the activity profile if, as an illustrative example, transaction data in combination with location data and image data clearly identifies the customer pocketing an item from a shelf and paying for another item during a self-checkout process. A lower confidence score can be assigned to the activity profile if, as another illustrative example, image data is too blurry to discern whether the customer has a gun on their hip or just a bag, and thus would not pose a security or safety risk in the store.

Block 414 can include, for example, analyzing customer posture and/or actions in the data associated with the activity profile (block 416). As described above, the computer system can employ one or more machine learning trained models to process the data and identify features in the data indicative of customer posture and/or actions most commonly associated with risky activity (e.g., theft, safety/security threats, etc.). For example, a model can be trained to distinguish activity of removing an item from a shelf and placing the item in a cart or basket from removing an item from the shelf and putting the item inside the customer's bag or clothes. The computer system can then assign a higher confidence score (e.g., above a threshold score value) to the latter and a lower confidence score (e.g., below the threshold score value) to the former.

The computer system can also determine price information of the item(s) in transaction data during a checkout process associated with the activity profile (block 418). The computer system can apply one or more models to the received data to determine whether a shortage might have occurred (e.g., image data of the customer at the checkout lane shows the customer putting an item in a bag without first scanning the item). The computer system can verify this determination with the transaction data to see whether all items appearing in the image data have been accounted/paid for on a receipt (e.g., the transaction data). If the computer system identifies an item in the image data that does not appear on the receipt, the computer system can retrieve, from a data store, information about the identified item, which can include a price of the item. If the price of the item exceeds some threshold price value, which is not reflected on the receipt, then the computer system can generate a high confidence score that the customer is involved in a shortage. If the price of the item may not be discernible from the received data, then the computer system can assign a low confidence score, indicating a low likelihood that the customer is engaging in a shortage event in the store.

The computer system can also identify a weapon on or near the customer in the data associated with the profile in block 420. As described above, the computer system can employ one or more models that have been trained to analyze the received data and extract or identify portions of the data that may be indicative of weapons. Object detection techniques can be performed in some implementations to identify weapons in image data. If a weapon is discernible or otherwise easily recognizable in the received data, then the computer system can generate a high confidence score indicating that the customer is likely engaged in a security/safety event. If the weapon is less discernible in the data (e.g., image data is blurry and something that looks like a weapon blends in with the customer's clothing), the computer system can assign a low confidence score indicating that it is less certain whether the customer is engaging in a safety/security event.

In some implementations, blocks 406-420 can be performed at a same time. In some implementations, blocks 414-420 can be performed before blocks 406-412. In some implementations, blocks 414-420 can be performed at the start of the process 400 (e.g., before or after block 402). Therefore, the computer system can first determine whether risky activity is apparent or likely in the data received for the store or in the activity profile (block 404). The computer system can determine whether risky activity is apparent or likely based on applying one or more machine learning trained models to the received data. The models can be trained to identify and score various features in the received data that can indicate one or more types of risky activity. If risky activity is apparent or likely, then the computer system can continue through the process 400. On the other hand, if risky activity is not apparent or not likely in the data received from the devices in the store (or in the activity profile), then the computer system may not perform the rest of the process 400, which can provide for efficient use of compute resources and processing power at the computer system.

Still referring to the process 400 in both FIGS. 4A-B, the computer system can determine whether the impact score and/or the confidence score satisfy risk criteria in block 422. In some implementations, the computer system can aggregate the impact score and the confidence score to determine an overall risk score for the user activity associated with the activity profile. For example, the two scores can be multiplied. The two scores can also be normalized in other ways. For example, a threshold-based trigger can be used to normalize the two scores and determine whether the normalized scores satisfy the risk criteria.

The risk criteria can be based on one or more factors. For example, the risk criteria can be associated with factors relevant to shortage events in the store. The risk criteria can also be associated with factors relevant to safety/security events in the store. The impact score and/or the confidence score can satisfy the risk criteria, as an illustrative example, if the dollar value of items involved in theft activity exceeds a threshold cost value. This can indicate that the theft associated with the customer's activity profile likely involves expensive items (or items that cost more than the threshold cost value), which makes the customer pose a greater risk to the store. Since the customer poses a greater risk, more serious action can and should be taken in response to the customer's activity. On the other hand, if the activity involves theft of an item that costs only $2, the risk criteria may not be satisfied and the activity either may not require a response or may require a less serious response than if the cost of the stolen item was higher (e.g., exceeding the threshold cost value).

As another illustrative example, the risk criteria can be satisfied if the confidence score exceeds a threshold score value. The threshold score value can be, in some implementations, 90-100% certainty that the activity poses a risk to the store. If the activity has a confidence score between 90-100%, the activity likely poses a serious risk to the store and therefore should be addressed with a more serious response/action. On the other hand, if the activity has a confidence score of 50% or less, then the activity may not pose as serious of a risk to the store and therefore may warrant no response or a less serious response than if the confidence score were higher.

As another example, the computer system can determine whether the impact score and/or the confidence score exceeds a general risk threshold value (block 424). If the general risk threshold value is exceeded, the risk criteria is satisfied. The general risk threshold value can pertain to both shortage and safety/security events in the store. Therefore, regardless of whether the activity in the activity profile is related to a shortage event or a safety/security event, the same general risk threshold value can be applied as the risk criteria. The general risk threshold value can be a numeric value on a same scale as the impact score and/or the confidence score. In some implementations, the impact score and the confidence score can be weighted and/or aggregated into a general risk score. Then the general risk score can be compared to the general risk threshold value to determine whether the risk criteria is satisfied in block 424.

The computer system can additionally or alternatively determine whether the impact score and/or the confidence score exceeds a safety risk threshold value (block 426). The safety risk threshold value can be used in implementations in which the activity in the activity profile is associated with safety/security events in the store. For example, if the computer system analyzes image data and determines a weapon is likely present near/on the customer's body, then the computer system can classify the customer's activity as a safety/security event. The computer system can then apply the safety risk threshold value in block 426 to determine whether the activity satisfies the risk criteria. As mentioned above, the safety risk threshold value can be on a numeric scale that corresponds to the impact score or the confidence score. In some implementations, the safety risk threshold value can be on a numeric scale that corresponds to a general risk score, which can be an aggregation/weighting of the impact score and the confidence score.

The computer system can additionally or alternatively determine whether the impact score and/or the confidence score exceeds a shortage risk threshold value (block 428). The shortage risk threshold value can be used in implementations in which the activity in the activity profile is associated with shortage events (e.g., theft, shoplifting, sweethearting, etc.) in the store. For example, if the computer system analyzes image data and transaction data and determines the customer put an item inside their jacket and did not pay for it during a checkout process, then the computer system can classify the customer's activity as a shortage event. The computer system can then apply the shortage risk threshold value in block 428 to determine whether the activity satisfies the risk criteria. As mentioned above, the shortage risk threshold value can be on a numeric scale that corresponds to the impact score or the confidence score. In some implementations, the shortage risk threshold value can be on a numeric scale that corresponds to a general risk score, which can be an aggregation/weighting of the impact score and the confidence score.

In some implementations, the computer system can determine which of the blocks 424-428 to perform based at least in part on analysis of the data associated with the activity profile (e.g., in block 404). For example, if the computer system determines that the user activity is likely associated with a shortage event, the computer system can perform block 424 and/or block 428. If the computer system determines that the user activity is likely associated with a personal safety risk, the computer system can perform block 424 and/or block 426.

Referring to blocks 422-428, if the computer system determines that the impact score and/or the confidence score satisfy the risk criteria (e.g., any of the scores exceed one or more of the threshold values in blocks 424-428), the computer system can proceed to block 430.

In block 430, the computer system can generate a response friction level for the activity profile that is above a threshold friction value. The computer system can then proceed to block 434, described further below. The response friction level can be a numeric, Boolean, integer, and/or string value. The response friction level can be assigned along a sliding scale demonstrating that various different responses to the customer activity can be pursued as the friction level increases. Accordingly, the higher the impact score and/or the confidence score, the more response friction, and the more serious the response(s) to the activity. The response friction level can indicate a seriousness or escalation of the response to the activity. The higher the response friction level, the more serious or escalated the response. The lower the response friction level, the less serious or deescalated the response. In other words, the higher the response friction level, the greater the action(s) will be taken to stop the activity of the customer and prevent further risk to the store.

As an illustrative example, a higher response friction level can cause the computer system to generate instructions for an in-store employee to approach the customer and apprehend them before they can leave the store. A higher response friction level can also cause the computer system to generate an automated system response to be executed by a checkout system that the customer is using. The automated system response can include, for example, halting the customer's checkout process and/or requiring the customer to rescan the items they are purchasing. On the other hand, a lower response friction level can cause the computer system to generate instructions for the in-store employee to simply monitor the customer or keep an eye out for the customer if and when they return to the store in the future. A lower response friction level can also cause the computer system to generate an automated system response to be executed by the checkout system that includes, for example, presenting tips to help the customer properly scan the items they wish to purchase. One or more other responses can be generated based on the response friction level, as shown and described in reference to FIGS. 2-3.

Referring back to blocks 422-428, if the computer system determines that the impact score and/or the confidence score do not satisfy the risk criteria (e.g., any of the scores do not exceed one or more of the threshold values in blocks 424-428), the computer system can proceed to block 432.

In block 432, the computer system can generate a response friction level for the activity profile that is below the threshold friction value. The computer system can then proceed to block 434. The response friction level below the threshold friction value can indicate that a less serious response can be made to the customer's activity, as described above. Refer to FIGS. 2-3 for additional discussion.

Next, in block 434, the computer system can determine an appropriate response to the user activity associated with the activity profile based on the response friction level. As described further in reference to FIGS. 5A-B, determining the appropriate response can include determining whether the response should be a human response or an automated system response. A human response can be preferred in some scenarios, such as when the customer is carrying a weapon or imposing harm or physical threats on other customers in the store. An automated system response, on the other hand, can be preferred in some scenarios, such as when the store has a limited number of employees on the floor and the customer is likely engaging in petty theft. It can be more efficient use of the labor resources available in the store if the automated system response is invoked instead of detracting an employee from their task to check on the customer during their checkout process. The type of activity in the activity profile can suggest an appropriate response. Determining the appropriate response can also include selecting a human or automated system response that corresponds to the response friction level that was determined in blocks 430 and 432. For example, a higher response friction level can correspond to an escalated human response, such as approaching and apprehending the customer while a lower response friction level can correspond to a less serious human response, such as simply monitoring the customer over a security camera in the store. As another example, a higher response friction level can correspond to an escalated automated system response, such as halting the customer's checkout process altogether while a lower response friction level can corresponded to a less serious automated system response of simply presenting helpful tips to the customer at the customer's checkout system. One or more other responses can be determined in block 434, as described and shown in reference to FIGS. 2, 3, and 5A-B.

The computer system can return the determined response in block 436. Returning the determined response, as depicted and described in FIGS. 1A-C can include transmitting instructions to an employee device to perform a human response. Returning the determined response can also include transmitting instructions to a checkout system used by the customer to execute an automated system response. The transmitted instructions can include objective identifiers for the customer (e.g., images of their hair, clothes, posture, email address, checkout system ID/location, location information in the store, transaction ID, MAC address, etc.), which can assist an employee (in the example of a human response) to objectively identify the customer and then carry out the human response. The transmitted instructions can also include information about the risky activity of the customer, such as whether the customer has a weapon, whether the customer assaulted or attacked someone while in the store, whether the customer likely has items in their clothing, whether the customer is hiding items on their body, whether the customer has scanned and/or purchased items, etc. Any of this information can be used to quickly and objectively identify and respond to the customer by the employee.

The instructions transmitted to the checkout system can, for example, cause the checkout system to lock a display screen or POS terminal such that the customer cannot scan any more items or select options to complete a checkout process. The instructions transmitted to the checkout system can also cause the checkout system to deactivate one or more scanning devices or otherwise prevent the scanning devices from detecting barcodes and other identifiers. The instructions transmitted to the checkout system can also cause the checkout system to present one or more notifications on a display of the checkout system. The notifications can, for example, present the customer with tips about how to scan items and/or how to bag items during the checkout process. The notifications can also present the customer with messages that something was not scanned correctly or that it seems as if one or more items were not scanned. One or more other notifications can also be generated and presented at the checkout system, based on the response friction level associated with the customer's activity profile.

Figure 5A:
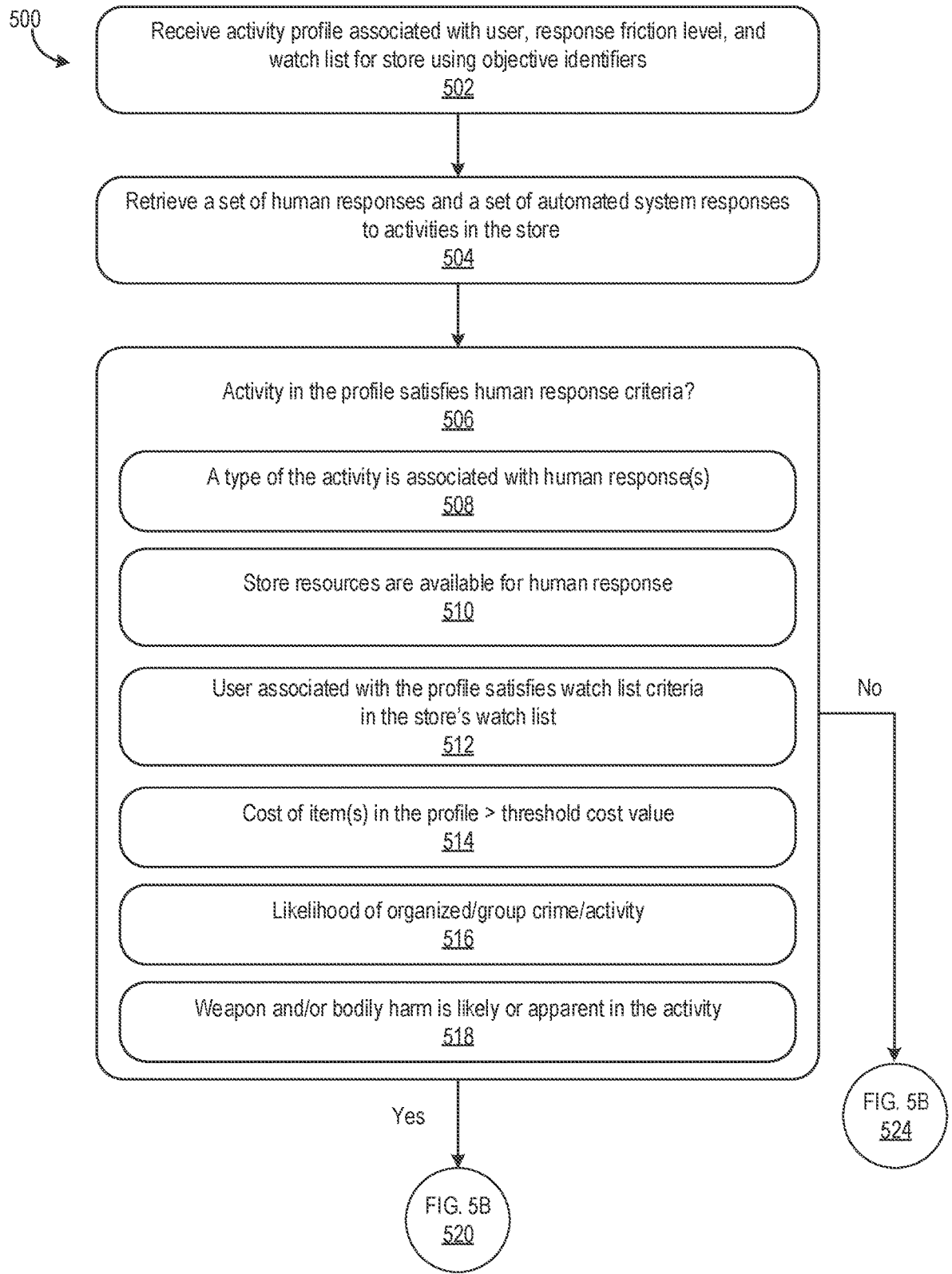
FIGS. 5A-B is a flowchart of a process for selecting between human and automated system responses to user activity in a retail environment.
Figure 5B:
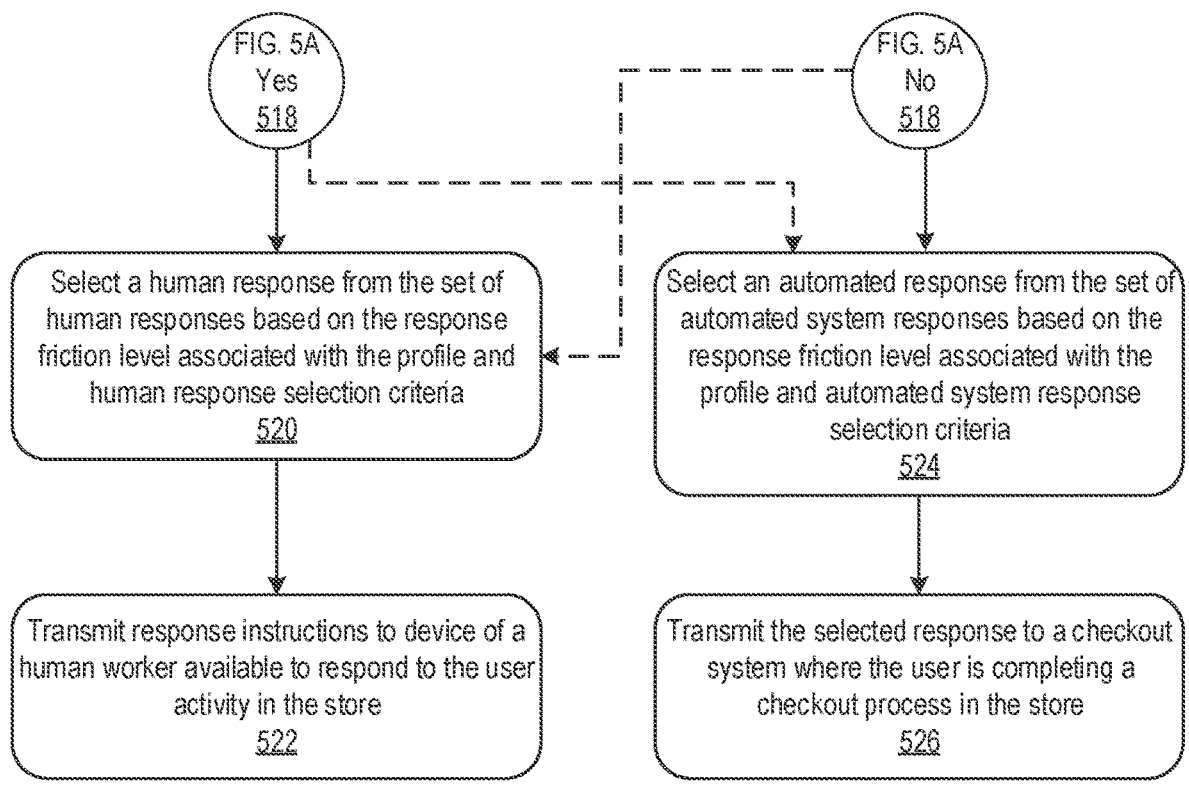

FIGS. 5A-B is a flowchart of a process 500 for selecting between human and automated system responses to user activity in a retail environment. The process 500 can be performed to determine whether a human response or an automated system response is preferred to respond to the particular user activity. This determination can be made based on a response friction level determined for the user's activity (e.g., refer to the process 400 in FIGS. 4A-B), the user's activity, and whether the customer appears on a watch list for the retail environment. Some types of user activity may warrant human responses (e.g., carrying a gun or other weapon, assault, other personal safety risks), regardless of severity or certainty of the user's risky activity. Some types of user activity may warrant automated system responses, which can be based on availability of labor resources in the retail environment (e.g., the retail environment can be short-staffed during a lunch period and when ticket switching is identified at a self checkout lane, it may be more labor resource efficient to generate an automatic response at the POS terminal to stop the customer's checkout process and require them to rescan items than to instruct an employee of the retail environment to leave their tasks/role to assist the customer and check whether they are in fact ticket switching.

The process 500 can be performed by the computer system 102. The process 500 can also be performed by one or more other computing systems, devices, computers, networks, cloud-based systems, and/or cloud-based services. For illustrative purposes, the process 500 is described from the perspective of a computer system.

Referring to the process 500 in both FIGS. 5A-B, the computer system can receive an activity profile associated with a particular customer or guest, the respective response friction level, and a watch list for the store (e.g., retail environment) in block 502. Any of this information can be received using objective identifiers associated with the customer of the activity profile. The computer system can receive the activity profile and the respective response friction level that were determined/generated in the process 400 of FIGS. 4A-B.

The watch list can be retrieved from a data store. The watch list can be associated with the store and can indicate trends of which customers have been involved in risky activities in the store over some predetermined period of time. The predetermined period of time can be, for example, a past day, 3 days, 5 days, 7 days, 2 weeks, month, etc. The watch list can identify customers by their objective identifiers and can indicate what type of activity they have been associated with and how recent they performed such activity. For example, a customer who has shoplifted electronic devices every other day for a past 2 months can be put on the watch list and ranked higher in the watch list than another customer who stole an electronic device once over the past 2 months. As another example, a customer who has a history of violence (e.g., the customer was released from prison recently) and has been seen in the store with a weapon can be ranked higher in the watch list than a customer who has not been violent but has engaged in organized crime or other theft. The watch list can therefore be used by the computer system to determine how much of a risk the particular customer poses to the store. If the customer appears on the watch list and/or the customer is ranked high on the watch list (e.g., above a threshold watch list ranking), then the computer system can escalate a type of human or automated system response to the customer's activity.

In block 504, the computer system can retrieve a set of human responses and a set of automated responses to different types of activities in the store. Each store in a network of stores can have different sets of responses based on available resources, in some implementations. The computer system can use a unique identifier for the store to search a data store of responses that are associated with the store's unique identifier.

Certain responses may be retrieved in block 504 based on short-term availability of labor resources. If a quantity of employees working the sales floor is below a threshold quantity of workers and/or the employees working the sales floor do not have the necessary skills/authority/job role to perform a human response (e.g., apprehending the customer and writing a report for law enforcement), then the computer system can retrieve just a set of automated responses and/or may retrieve a set of human responses that can be completed by the limited quantity of employees currently working. As another example, certain responses may be retrieved based on long-term availability of resources in the store. If the store does not have any self-checkout lanes, in some implementations, then the computer system can retrieve human responses and/or automated responses that can be performed by in-store systems other than self-checkout systems.

The computer system can also retrieve the set or sets of responses based on the type of activity in the activity profile. For example, the computer system can retrieve a set of human responses and/or a set of automated responses that are typically used in response to theft. The computer system can retrieve a set of human responses and/or a set of automated responses that are typically used in response to physical or bodily harm. The computer system can retrieve a set of human responses and/or a set of automated responses that are typically used in response to general shortage events. The computer system can retrieve a set of human responses and/or a set of automated responses that are typically used in response to specific types of shortage events. Also, the computer system can retrieve a set of human responses and/or a set of automated responses that are typically used in response to any type of safety/security event. The computer system can retrieve a set of human responses and/or a set of automated responses that are typically used in response to specific types of safety/security events.

The computer system can determine whether activity in the activity profile satisfies human response criteria in block 506. For example, the computer system can determine whether a type of the activity is associated with human responses (block 508). If the type of activity in the activity profile is typically responded to using human intervention, then the block 508 can be met and the human response criteria can be satisfied. The computer system can analyze historic events and activity responses stored in the data store to determine whether a human response was typically invoked. The activity may be associated with human responses if, for example, the activity involves harm or weapons, in which a system in the store may not be able to stop the customer and confiscate their weapon but another person, such as an employee (e.g., safety and security personnel) can. The activity may also be associated with human responses if, for example, the activity is part of an organized crime of theft and presenting a prompt on a checkout system may not deter the customer or other organized customers from continuing to steal items from the store. The activity may also be associated with human responses if, for example, the customer is a repeat offender and has stolen items multiple times and has not been deterred in the past by automated responses (e.g., prompting the customer to re-scan items, halting the customer's transaction, etc.). One or more other examples of activity that typically is associated with human responses is also possible.

The computer system can additionally or alternatively determine whether store resources are available for a human response in block 510. The store resources can be available labor resources. If the store currently has less than a threshold quantity of employees working, then there may not be sufficient labor resources to prompt one of the employees to leave their task/role and respond to the customer's activity. As another example, if the employees currently working do not have the necessary skills to respond to the customer's activity (e.g., the employee is a student who re-stocks shelves and does not have experience in confronting and apprehending aggressive customers), then the store resources are not available for a human response. On the other hand, if the quantity of employees working the store is low but the customer is part of organized crime, is carrying a weapon, and/or is engaging in a big theft (e.g., theft of item(s) exceed(s) threshold cost value), then it can be an efficient use of the available labor resources to prompt one of the employees to approach and apprehend the customer. Doing so can stop the customer's current activity and potentially deter the customer from continuing this activity in the future. If, however, the customer is merely stealing tube of lipstick, it can be an inefficient use of the available labor resources if an employee were to respond to the customer. After all, it takes the same amount of time, energy, skills, and resources to apprehend and write a report about the customer involved in organized crime and the customer who stole the lipstick. However, apprehending and reporting the customer involved in organized crime can pose a greater risk to the store, and thus should be apprehended and reported to deter or otherwise prevent such organized crime from continuing.

In some implementations, in block 510, the computer system can determine whether the store has available system resources capable of performing automated system responses. For example, if the store does not have self-checkout systems, then one or more automated system responses may not be performed. Therefore, the computers system can determine that the activity should be responses to with human responses.

The computer system can also determine whether the customer associated with the profile satisfies watch list criteria in the store's watch list (block 512). A frequency and/or how recently the customer was identified as engaging in risky activity in the store and thus appears on the watch list can indicate whether the customer poses a significant enough risk to the store to warrant using labor resources in a human response. The higher the customer appears on the watch list, the more likely that a human response is warranted. If the customer appeared multiple times on one or more watch lists over some predetermined period of time (e.g., a past 3 days, a past week, a past 2 weeks, a past month, etc.), then a human response is likely warranted. Similarly, if the customer appeared at least a threshold amount of times on the watch list, then a human response is likely warranted. In some implementations, the computer system can also retrieve a watch list for a nearby store or stores. If the customer appears in those watch lists, then the computer system can determine that a human response is warranted to stop the customer from continuing to hit multiple stores in a geographic area/location/region.

As another example, the computer system can determine whether the cost of item(s) in the activity associated with the profile exceeds a threshold cost value (block 514). The more expensive the item(s) involved in a shortage, for example, the more efficient it may be to use labor resources to stop the customer. As a result, the customer can be stopped from continuing to steal expensive items. As mentioned above, if the customer instead engages in occasional petty theft, then it may be an inefficient use of labor resources to monitor, apprehend, and/or report the customer.

In block 516, the computer system can determine likelihood that the customer associated with the activity profile is also associated with organized/group crime/activity. The computer system can, for example, analyze the watch list for the store and determine what activities the customer has been listed for. The computer system can also compare the customer's activities to those of other customers appearing on the watch list to find a correlation between customers, activities, and/or items involved in those activities. The computer system can also receive law enforcement reports describing organized crime in a geographic region of the store. The computer system can use the reports to analyze the customer's activity and determine whether it matches the profile of the organized crime. Similarly, the computer system can receive reports or watch lists from other stores in the same geographic region of the store. The computer system can analyze those reports and/or watch lists in relation to the customer's activity to determine whether they are associated with organized crime. The computer system can generate a confidence score indicating likelihood that the customer is engaged in organized crime. If the confidence score exceeds a threshold confidence value, the computer system can determine that the human response criteria is satisfied. Monitoring, apprehending, and/or reporting the customer can be beneficial to stop, deter, or otherwise prevent the organized crime.

The computer system can additionally or alternatively determine in block 518 whether a weapon and/or bodily harm is likely or apparent in the activity associated with the profile. Based on analysis of data associated with the customer's activity profile (e.g., refer to the process 400 in FIGS. 4A-B), the computer system can generate a likelihood value that the customer is carrying a weapon or engaging in physical violence. If the likelihood value exceeds some threshold value, then the computer system can determine that the human response criteria is satisfied. After all, a human response can be more effective in stopping a person wielding a gun or attacking another person than performing an automated system response like halting the person's transaction during a checkout process.

In some implementations, the computer system can perform one or more of the blocks 508-518 as part of determining whether the activity in the profile satisfies the human response criteria in block 506. In some implementations, one or more of the blocks 508-518 can be performed in order to perform subsequent blocks 508-518 as part of the determining in block 506. In some implementations, the computer system can also determine which of the blocks 508-518 to perform based on the type of activity in the activity profile. For example, if the type of activity is associated with shortages/theft, then the computer system may perform blocks 508, 510, 514, and/or 516. As another example, if the type of activity is associated with safety risks, then the computer system can perform blocks 508, 510, 512, 516, and/or 518. One or more other variations of performing the blocks 508-518 is also possible.

Referring back to block 506, if the computer system determines that the activity in the profile satisfies the human response criteria, the computer system can proceed to block 520. In block 520, the computer system can select a human response from the set of human responses based on the response friction level associated with the profile. The selection of the human response can also be based on human response selection criteria. The human response selection criteria can indicate which types of human responses may be warranted for types of customer activity.

As an example, if the response friction level associated with the profile is within a range of first values, the computer system can determine that a first human response selection criteria is satisfied and that a first type of human response can be selected. As another example, if the response friction level associated with the profile is within a range of second values, the computer system can determine that a second human response selection criteria is satisfied and that a second type of human response can be selected. As another example, if the response friction level associated with the profile is within a range of N values, the computer system can determine that an N human response selection criteria is satisfied and that an N type of human response can be selected. Refer to FIG. 3 for additional information about selecting the human response based on the response friction level falling within a range of values. Refer to FIG. 2 for additional information about selecting the human response along a sliding scale of response friction levels.

The computer system can then transmit response instructions to a device of a human worker available to respond to the user activity in the store (block 522). The computer system can, for example, first determine which employee in the store is available to respond. For example, the computer system can determine which employee has prerequisite skills to perform the human response, which employee just completed a task in their job role and is available, which employee is physically closest to a location of the customer, which employee has performed similar human responses in the past, etc. Once the computer system determines which employee should respond to the customer's activity, the computer system can transmit the instructions to a mobile device of the employee. As described herein, the mobile device can be a user computing device, such as a cellphone, mobile phone, smartphone, laptop, tablet, and/or wearable device. Refer to block 436 in the process 400 in FIGS. 4A-B for additional discussion about the transmitted instructions.

Referring back to block 506, if the computer system determines that the activity in the profile does not satisfy the human response criteria, the computer system can proceed to block 524. In block 524, the computer system can select an automated response from the set of automated system responses based on the response friction level associated with the profile. The selection of the human response can also be based on automated system response selection criteria. Refer to the discussion in block 520 about selecting the human response. Also refer to FIGS. 2-3 for additional discussion about selecting the automated system response.

The computer system can then transmit the selected response to a checkout system or other device in the store where the customer is completing a checkout process (block 526). In some implementations, the selected automated response can also be transmitted to and performed by a user mobile device, mobile checkout device, scan-and-go devices, and/or smart shopping carts. For example, the automated response can be transmitted to the customer's mobile device, which was used by the customer to scan items in the store and/or pay for items during the checkout process. The automated response can be outputted or presented in a GUI display in a mobile application presented at the customer's mobile device. The mobile application, for example, can provide functionality for the customer to scan items for purchase in the store and maintain payment information so that the customer can pay with an e-wallet. As an illustrative example, an alert or other notification can be presented in the mobile application, that may prevent the customer from paying with their payment information. In some implementations, alerts or other similar automated responses can also be transmitted to and executed at employee devices such as employee devices and/or walkie-talkies or other radio communication devices. Refer to block 436 in the process 400 in FIGS. 4A-B for additional discussion about transmitting the selected response to the checkout system or other device in the store.

In some implementations, even if a human response is warranted based on a determination in block 506 that the human response criteria is satisfied, the computer system can also determine that an automated response should be invoked, or vice versa. Therefore, the computer system can blend together one or more human and/or automated responses. For example, the computer system can determine that the customer should be monitored by an employee during their checkout process. During the checkout process, the computer system can analyze image data and transaction data and determine that the customer is not scanning all the items they wish to purchase (instead the customer is pocketing some items and scanning others). Therefore, the computer system can select an automated response to also be performed in which the checkout system prompts the customer to re-scan their items. If the customer does not re-scan all their items, the computer system can escalate the responses by (i) selecting a human response to approach and apprehend the customer and/or (ii) selecting an automated response to completely halt the customer's transaction. Thus, the computer system can blend both human and automated responses based on how the customer's activity may develop, escalate, or otherwise not be deterred by a response that has been executed. As another example, the computer system can select an automated response of causing a lane light at the checkout lane to blink and a human response of an employee approaching the customer while the lane light is blinking to assist the customer through the checkout process. Accordingly, the computer system can select a human response in block 520 and also select an automated response in block 524. The computer system can then perform both blocks 522 and 526. Likewise, the computer system can select an automated system response in block 524 and also select a human response in block 520. The computer system can then perform both blocks 522 and 526.

In some implementations, the computer system can determine whether an automated system response can be performed before determining whether the activity satisfies the human response criteria in block 506. For example, if the activity in the profile can simply and efficiently be resolved with an automated system response, or the response friction level is below a threshold friction level, then blocks 506-518 can be skipped and the computer system can simply select an appropriate automated system response from the set of automated system responses. This can be a beneficial approach for efficiently using available compute resources and also saving limited labor resources.

In some implementations, the computer system may store selected responses with the particular activity profile in a data store. The computer system can also store results from performing those responses with the activity profile. As a result, at future times, the computer system can retrieve information about the selected responses and/or results from invoking those responses, if and when the customer associated with the profile returns to the store. Prior human and/or automated responses can be leveraged to identify and select optimal responses to prevent and/or deter the particular customer from continuing to perform risky or suspicious activity in the future.

Figure 6:
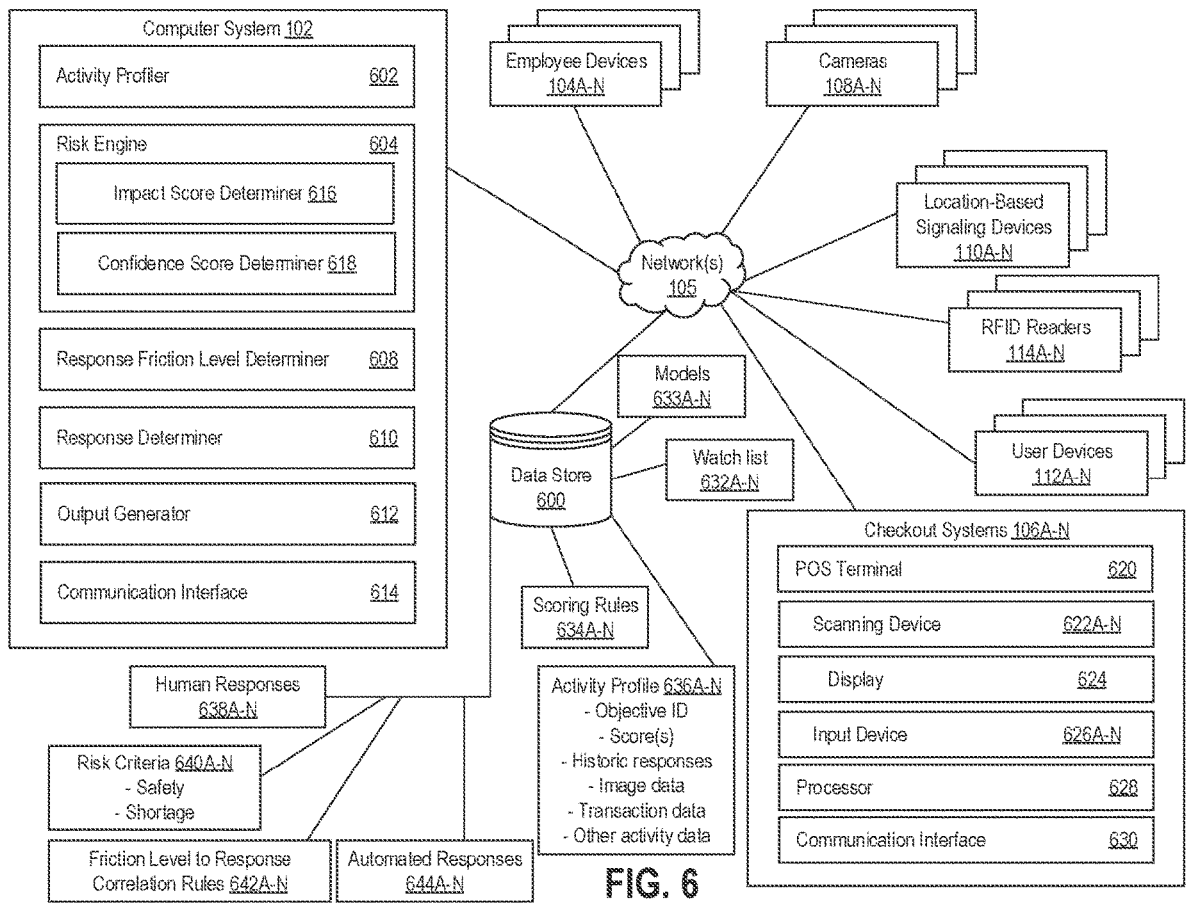
FIG. 6 is a system diagram of system components that can be used to perform the techniques described herein.

FIG. 6 is a system diagram of system components that can be used to perform the techniques described herein. The computer system 102, employee devices 104A-N, checkout systems 106A-N, cameras 108A-N, location-based signaling devices 110A-N, RFID readers 114A-N, user devices 112A-N, and data store 600 can be in communication (e.g., wired and/or wireless) via the network(s) 105.

The employee devices 104A-N can include any type of mobile computing device, such as a mobile phone, smartphone, laptop, tablet, and/or wearable device. Each employee in a retail environment or store can be assigned an employee device 104A-N using a unique employee ID. In some implementations, the employee devices 104A-N can include personal computing devices of the employees rather than devices provided to them by the store.

The cameras 108A-N, as described in reference to FIG. 1A, can be positioned throughout the store in various locations. The cameras 108A-N can capture still image and/or videos of their designated/calibrated field of views. Moreover, the cameras 108A-N can continuously capture image data. Some of the cameras 108A-N can be triggered to capture image data when a particular action occurs. For example, if a customer starts a checkout process at one of the checkout systems 106A-N, a camera positioned near the checkout system can be activated to capture image data of the customer and the area surrounding the checkout system during the customer's checkout process. The cameras 108A-N can already be installed in the store and part of a security camera system therein. In some implementations, the store can be retrofitted with other, new, and/or additional cameras. Moreover, the cameras 108A-N can be configured to capture high resolution image data. The high resolution image data can be efficiently transmitted to and processed by the computer system 102 without losing the high resolution quality of the image data. Therefore, the high resolution image data can be used to accurately assess actions of customers' activities in the store. Sometimes, one or more of the cameras 108A-N can also capture low resolution image data.

The location-based signaling devices 110A-N can be configured to ping (e.g., transmit a request to) any of the user devices 112A-N as the user devices 112A-N pass the devices 110A-N in various locations throughout the store. By pinging the user devices 112A-N, the user devices 112A-N can transmit a mobile device identifier, such as a MAC address, to the location-based signaling devices 110A-N. The MAC address can be correlated with a timestamp generated by the devices 110A-N that indicates when and where the customer was located in the store. Therefore, the customer's location(s) in the store can be documented with objective identifiers, such as the MAC address, to be correlated with other data collected by other devices in the store.

The RFID readers 114A-N can be any type of device for detecting RFIDs as well as other types of unique identifiers that may be attached to items as well as baskets/carts in the store, including but not limited to barcodes, SKUs, labels, and other tags. The RFID readers 114A-N can be configured to detect when an RFID tag comes within a vicinity or range of the readers 114A-N. When an RFID tag is detected, the readers 114A-N can generate timestamped data indicating a location of the particular RFID tag at a time it was detected. This information can be correlated with the other data collected by the other devices in the store (e.g., such as the MAC address of the customer from the location-based signaling devices 110A-N) to analyze and assess the customer's activity.

The user devices 112A-N can include any type of mobile computing device, such as a mobile phone, smartphone, laptop, tablet, and/or wearable device. The user devices 112A-N can be personal computing devices of the customers in the store. Each customer can have their own user device. The customers can open a mobile application associated with the store at their user devices 112A-N and log into their personal accounts (e.g., via username, email, phone number, password, or other objective identifiers). The customers can use the mobile application to search for items in the store, add items to an online shopping cart, complete online orders, scan items in the store while they are shopping, and/or pay for their items during the checkout processes at the checkout systems 106A-N. For example, the user devices 112A-N can present mobile wallets with payment information, which can be used to simply and quickly complete a checkout process at a self-checkout lane and/or a manual checkout lane. Location data from the user devices 112A-N and/or objective identifiers, such as MAC addresses, can be collected by the computer system 102 from the user devices 112A-N and used to correlate the other data with a particular customer and analyze the customer's activity in the store, as described herein.

The checkout systems 106A-N can include self-checkout lanes and/or manual lanes worked by employees. The checkout systems 106A-N can be used to perform checkout processes in the store at the end of a shopping trip. The checkout systems 106A-N can each include a POS terminal 620, scanning devices 622A-N, display 624, input devices 626A-N, processor 628, and communication interface 630. In some implementations, the checkout systems 106A-N can also include output devices that are different than the display 624, such as speakers, another display screen, and/or a device for providing haptic feedback.

The POS terminal 620 can be configured to identify products that are scanned using the one or more scanning devices 622A-N. For example, the POS terminal 620 can receive a scan of an item label from the one or more scanning devices 622A-N. Using the scan of the label, the POS terminal 620 can retrieve/determine a price of the item associated with the label. The POS terminal 620 can add the determined price to the customer's bill (e.g., transaction, receipt). The POS terminal 620 can also receive payment information from the customer, including but not limited to discounts, offers, or other types of promotions. The POS terminal 620 can update the customer's transaction data and complete a checkout process upon receipt of the customer's payment information. The customer can, for example, scan, using the scanning devices 622A-N, a barcode or other unique identifier presented on their user device 112A-N representing their mobile wallet information. The POS terminal 620 can receive the scanned identifier and use that to look up the customer's mobile wallet information in the data store 600 and/or receive the mobile wallet information directly from the user device 112A-N. The POS terminal 620 can then apply the mobile wallet information to the customer's transaction to complete the checkout process and therefore pay for the customer's items.

The scanning devices 622A-N can be integrated into a flatbed of the checkout systems 106A-N. The scanning devices 622A-N can also be standalone devices and/or handheld devices. In some implementations, scanning devices 622A-N can include one or more cameras or other imaging devices integrated into the flatbed or other regions of the checkout systems 106A-N. In such scenarios, the cameras or other imaging devices can be configured to capture images of items as the customer scans them. These images can be used by the computer system 102 to determine whether the customer is scanning all the items they are purchasing (and thus the items that appear in the customer's transaction data). The scanning devices 622A-N can be barcode, SKU, or other label identifying devices. The scanning devices 622A-N can also be LiDAR, infrared, and one or more other types of scanning devices and/or flatbed scanners. In some implementations, the one or more scanning devices 622A-N can include a handheld scanner that the customer can direct towards a label, such as a barcode, attached to an item that the customer is purchasing. Moreover, in some implementations, the handheld scanner can include a camera that captures images of the item as it is being scanned, which can further be used by the computer system 102 to determine whether the customer is shoplifting or engaging in other risky activity during the checkout process.

The display 624 can be any type of screen, such as a touch screen, LED screen, OLED screen, etc. The display 624 can output information about the customer's transaction. For example, the display 624 can output information about scanned items and their associated prices in real-time, as the customer scans the items. In some implementations, such as when the computer system 102 selects an automated system response to the customer's risky activity, the display 624 can present a notification that prompts the customer to re-scan items, check the contents of their basket/cart before completing the checkout process, etc. The customer can also input information at the display 624 about items being purchased, such as a quantity and/or weight of such items. The customer can also use the display 624 to look up items that the customer is purchasing (e.g., fresh produce that may not have barcodes or other identifying labels attached to them). In some implementations, the POS terminal 620 can be integrated with the display 624 and/or one or more of the scanning devices 622A-N.

The input devices 626A-N can include keyboards, touchpads, touch screen displays, and/or microphones that can be used by the customer to provide information during the checkout process. For example, the customer can use the input devices 626A-N to manually enter information about an item they are purchasing that does not have a label/barcode on it (e.g., fresh produce). The customer can also use the input devices 626A-N to swipe a credit card, provide cash payment, and/or manually enter login information for the customer's account with the store (e.g., their mobile wallet information). In some implementations, the input devices 626A-N can include the POS terminal 620, the scanning devices 622A-N, and/or the display 624.

The processor 628 can be configured to make real-time determinations of item identification and optionally item-to-label matching. The processor 628 can also be configured to make updates to the customer's transaction data based on items scanned, promotions/offers added to the transaction, etc. In some implementations, the processor 628 can be an edge computing device. In some implementations, the processor 628 can deploy one or more machine learning models to identify an item from image data captured by one or more cameras 108A-N at or near the checkout systems 106A-N. The processor 628 can therefore quickly and accurately determine what item is being scanned by the customer and whether that item matches the scanned label. Such real-time determinations made at the edge can utilize less computational resources and avoid clogging network bandwidth, which can be beneficial to improve the computer system 102's ability to analyze the customer's activity and determine whether the activity is risky enough to warrant one or more human and/or automated responses.

The communication interface 630 can be configured to provide communication over the network(s) 105 between the system components described herein.

In some implementations, the checkout systems 106A-N can also include light poles having cameras and/or lights attached thereto. The camera, for example, can face down over the flatbed of the respective checkout system 106A-N. The camera can be a high resolution camera. In some implementations, the camera can have 1920×1080 resolution. The light can provide consistent lighting over the flatbed area. In some implementations, the light can also be activated as part of an automated system response when the customer is suspected of engaging in risky activity, such as paying for certain items and not paying for others during the checkout process. The camera can be configured to capture images of items as they are scanned by the scanning devices 622A-N. These images can be used for identifying an item that the customer is purchasing in real-time to then determine, by the processor 628 and/or the computer system 102, whether the customer is scanning and paying for all the items they are purchasing.

The data store 600 can be any type of database, storage system, cloud-based storage, and/or memory for storing information about customers, information about stores, human responses, automated system responses, rules, watch lists, etc., as described further below.

The computer system 102 can be any type of computing system, computing device, edge computing device, remote computing system, cloud-based system, and/or computer configured to perform the techniques described herein. The computer system 102 can include an activity profiler 602, risk engine 604, response friction level determiner 608, response determiner 610, output generator 612, and communication interface 614.

The activity profiler 602 can be configured to receive data collected by the devices 106A-N, 108A-N, 110A-N, 114A-N, and/or 112A-N and associate such data with a customer in the store. The activity profiler 602 can make the association using objective identifiers for the customer, as described herein. The associated activity (e.g., as shown in image data, transaction data, and other activity data described herein) can then be stored, in the data store 600, as an activity profile 636A-N for the customer. The activity profiler 602 can also be configured to retrieve (from the data store 600) and apply one or more models 633A-N to the data in the activity profile to identify a type of activity of the customer (e.g., shortage event, such as theft, safety/security event, etc.). For example, the models 633A-N can be applied to image data in the profile to identify aggressive posturing of the customer and/or a weapon on the customer's body.

The risk engine 604 can be configured to assess risk associated with the customer's activity in the activity profile. For example, the risk engine 604 can include an impact score determiner 616 and a confidence score determiner 618. The impact score determiner 616 can be configured to determine a level of risk posed by the customer's activity, as described above in reference to FIGS. 4A-B. The confidence score determiner 618 can be configured to determine a likelihood or confidence that the customer's activity is risky/poses a threat to the store, as described above in reference to FIGS. 4A-B. The determiners 616 and 618 can generate the scores using scoring rules 634A-N retrieved from the data store 600. The rules 634A-N can indicate ranges of values, values, and/or value scales that can be assigned to the customer's activity. The scores generated by the determiners 616 and 618 can be stored in the activity profile 636A-N of the customer in the data store 600.

The risk engine 604 can also use risk criteria 640A-N corresponding to safety/security events and/or shortage events to determine a type of risk associated with the customer's activity. The determines 616 and 618 can also use the risk criteria 640A-N to determine a value for the impact score and/or confidence score assigned to the customer's activity. Moreover, in some implementations, the risk engine 604 can aggregate and/or weight the impact score and the confidence score to determine an overall risk score for the customer's activity. The overall risk score can then be used by the response friction level determiner 608 and/or the response determiner 610 to determine an appropriate response to the customer's activity.

The response friction level determiner 608 can be configured to use the impact score, the confidence score, and/or the overall risk score to determine a response friction level for the customer's activity, as described further in reference to FIGS. 4A-B. The determiner 608 can retrieve, from the data store 600, friction level to response correlation rules 642A-N to be used in determining the response friction level. In some implementations, the determiner 608 can also retrieve historic responses data from the activity profile 636A-N. The historic responses data can be used to determine whether the customer has been resistant to responses in the past. If the customer has been resistant in the past, for example, the determiner 608 can generate a higher response friction level than if the customer had not been resistant in the past (or had not been responded to in the past). In some implementations, the determiner 608 can also retrieve watch lists 632A-N for the store from the data store 600. The determiner 608 can analyze the watch list 632A-N to determine whether the customer has previously been added to the watch list 632A-N. If the customer has been added to the watch list 632A-N in the past, then the determiner 608 may generate a higher response friction level than if the customer had not been previously added to the watch list 632A-N.

The response determiner 610 can be configured to select a human response and/or automated system response based on at least the response friction level associated with the customer's activity in the activity profile 636A-N. The determiner 610 can also determine the appropriate response based on the impact score, the confidence score, and/or the overall risk score attributed to the customer's activity by the risk engine 604. The determiner 610 can also use the watch lists 632A-N to determine the appropriate response. The determiner 610 can also retrieve or receive real-time information about available resources in the store (e.g., from a computing device in the store, from an employee device 104A-N, from the data store 600, etc.), which can be used to determine whether there are sufficient labor resources to execute a human responses or whether it would be preferred to save the labor resources and instead execute an automated system response. The determiner 610 can retrieve human responses 638A-N and/or automated responses 644A-N from the data store 600. The determiner 610 can select any one or more of these retrieved responses as the appropriate response to the customer's activity. In some implementations, the determiner 610 can store the selected response in the corresponding activity profile 636A-N in the data store 600. The determiner 610 can also transmit the selected response to the output generator 612. Refer to FIGS. 5A-B for additional discussion about selecting the appropriate response.

The output generator 612 can be configured to generate instructions for executing the selected response to the customer's activity. The generated instructions can then be transmitted, by the generator 612, to one of the employee devices 104A-N if the selected response is a human response. The generated instructions can also be transmitted to one of the checkout systems 106A-N (or one or more other devices in the store) if the selected response is an automated system response. Refer to FIGS. 4A-B for additional discussion about generating and transmitting the instructions for executing the response.

Finally, the communication interface 614 can be configured to provide communication over the network(s) 105 between and amongst any of the system components described herein.

Figure 7:
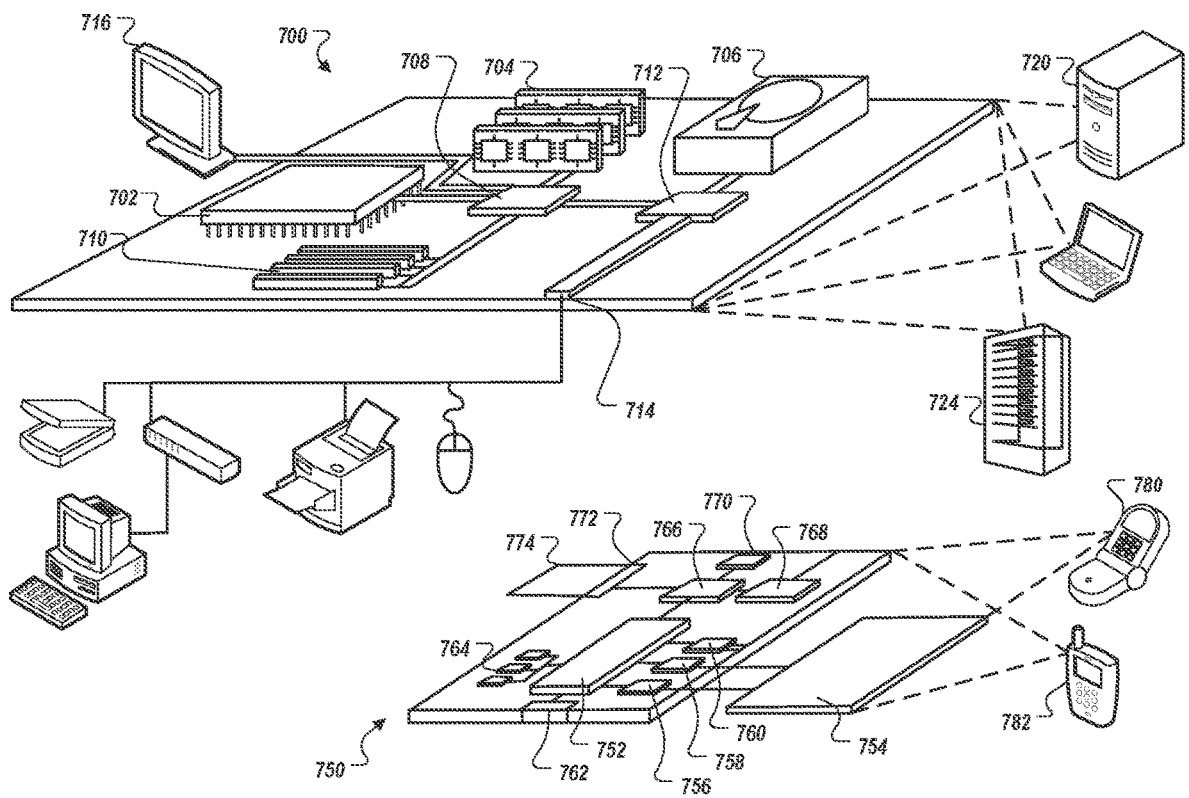
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for automatically detecting and responding to potentially suspicious or risky activity in a retail environment, the system comprising:
   one or more monitoring devices positioned throughout the retail environment that are configured to generate a stream of activity data detailing activity within the retail environment, wherein the stream of activity data includes unstructured data;
   a point of sale (POS) terminal that includes at least (i) a scanner configured to scan item identifiers during a checkout process, (ii) a display device configured to display information during the checkout process, and (iii) a payment terminal configured to receive and process payment information during the checkout process;
   a plurality of mobile devices that are associated with employees within the retail environment, each of the plurality of mobile devices including at least (i) a wireless transceiver configured to wirelessly transmit and receive information, (ii) a user interface configured to output information to and to receive input from a corresponding user, and (iii) an indoor location module configured to determine and transmit location information;
   a computer system in communication with the one or more monitoring devices, the point of sale terminal, and the plurality of mobile devices, wherein the computer system is configured to perform operations comprising:
      receiving, from the one or more monitoring devices, the stream of activity data;
      applying a model to the stream of activity data to identify a portion of the stream of activity data corresponding to activity of a guest during the checkout process, the model being trained to identify features in the portion of the stream of activity data indicative of a risk event;
      identifying, based on the portion of the stream of activity data, whether a risk event is associated with the activity of the guest during the checkout process;
      determining a risk impact score for the guest based on a determination that the risk event is associated with the activity of the guest;
      determining a risk confidence score for the guest, wherein the risk confidence score indicates a likelihood that the activity of the guest is associated with the risk event;
      generating a response friction level for the activity of the guest based on determining whether at least one of the impact score and the confidence score satisfy risk criteria, wherein the response friction level corresponds to an escalation of a type of response to be taken for the activity of the guest;
      selecting (i) a particular manual response from among a plurality of candidate manual responses to the activity of the guest and (ii) a particular automated response from among a plurality of candidate automated responses to the activity of the guest based, at least in part, on the response friction level satisfying at least one of manual response criteria and automated response criteria;
      transmitting instructions to the POS terminal to implement the particular automated response, wherein transmitting the instructions causes the particular automated response to be provided using one or more of the scanner, the display device, and the payment terminal;
      selecting one or more mobile devices from among the plurality of mobile devices based, at least in part, on the location information for the mobile devices relative to a location of the POS terminal; and
      transmitting instructions to implement the particular manual response to the selected one or more mobile devices, wherein transmitting the instructions causes corresponding instructions to be outputted in the user interface at the selected one or more mobile devices to prompt corresponding employees to perform the manual response with regard to the guest at the POS terminal.

2. The system of claim 1, wherein the risk event is a shortage event or a security event, wherein the shortage event includes at least one of theft, shoplifting, ticket switching, and sweethearting, and wherein the security event includes at least one of bodily harm, physical threat, verbal threat, terror, aggression, carrying a weapon in the retail environment, and assault.

3. The system of claim 1, wherein the one or more monitoring devices comprises a camera configured to generate the stream of activity data that includes at least one of image data or video data.

4. The system of claim 1, wherein the one or more monitoring devices comprises the POS terminal, wherein the POS terminal is configured to generate the stream of activity data that includes transaction data during the checkout process.

5. The system of claim 1, wherein the one or more monitoring devices comprises a location-based signaling device that is configured to generate the stream of activity data that includes location-based data of at least one of (i) a mobile device of the guest as the guest moves throughout the retail environment and (ii) a shopping cart that the guest pushes throughout the retail environment.

6. The system of claim 1, wherein the stream of activity data includes system-based inferences, wherein the POS terminal is configured to generate a system-based inference indicating that the guest likely performed ticket switching based on identifying, by the POS terminal and during the checkout process, a mismatch between an item identifier that the guest scanned with the scanning device and an item imaged during the checkout process.

7. The system of claim 1, wherein the operations further comprise identifying and associating a portion of the stream of activity data with a guest currently using the POS terminal during the checkout process.

8. The system of claim 1, wherein:
   selecting the particular manual response from among the plurality of candidate manual responses to the activity of the guest comprises selecting the manual response based on at least one of (i) the manual response being an expected response to the activity of the guest, (ii) the response friction level exceeding a threshold friction value, and (iii) labor resources in the retail environment satisfying a threshold labor availability condition to provide for manual response to the activity of the guest, and
   selecting the particular automated response from among the plurality of candidate automated responses to the activity of the guest comprises selecting the automated response based on at least one of (i) the automated response being an expected response to the activity of the guest, (ii) the response friction level being less than a threshold friction value, and (iii) labor resources in the retail environment not satisfying a threshold labor availability condition to provide for a manual response the activity of the guest.

9. The system of claim 1, wherein selecting the particular manual response from among the plurality of candidate manual responses to the activity of the guest comprises selecting at least one of:
  (i) instructions, based on the response friction level being within a first range of friction values, that, when outputted at the selected one or more mobile devices, prompt the corresponding employees to let the activity of the guest pass,
  (ii) instructions, based on the response friction level being within a second range of friction values greater than the first range of friction values, that, when outputted at the selected one or more mobile devices, prompt the corresponding employees to observe the guest,
  (iii) instructions, based on the response friction level being within a third range of friction values greater than the first and second ranges of friction values, that, when outputted at the selected one or more mobile devices, prompt the corresponding employees to approach the guest at the POS terminal and provide assistance during the checkout process,
  (iv) instructions, based on the response friction level being within a fourth range of friction values greater than the first, second, and third ranges of friction values, that, when outputted at the selected one or more mobile devices, prompt the corresponding employees to investigate the activity,
  (v) instructions, based on the response friction level being within a fifth range of friction values greater than the first, second, third, and fourth ranges of friction values, that, when outputted at the selected one or more mobile devices, prompt the corresponding employees to approach the guest and perform a receipt check before the guest exits the retail environment, and
  (vi) instructions, based on the response friction level being within a sixth range of friction values greater than the first, second, third, fourth, and fifth ranges of friction values, that, when outputted at the selected one or more mobile devices, prompt the corresponding employees to approach and apprehend the guest.

10. The system of claim 1, wherein selecting the particular automated response from among the plurality of candidate automated responses to the activity of the guest comprises selecting at least one of:
  (i) instructions, based on the response friction level being within a first range of friction values, that, when executed by the POS terminal, cause the POS terminal to perform no action and let the activity pass,
  (ii) instructions, based on the response friction level being within a second range of friction values greater than the first range of friction values, that, when executed by the POS terminal, cause the POS terminal to present, at the display device, checkout tips to guide the guest through the checkout process,
  (iii) instructions, based on the response friction level being within a third range of friction values greater than the first and second ranges of friction values, that, when executed by the POS terminal, cause the POS terminal to actuate a lane light at the POS terminal, wherein actuating the lane light causes the lane light to flash,
  (iv) instructions, based on the response friction level being within a fourth range of friction values greater than the first, second, and third ranges of friction values, that, when executed by the POS terminal, cause the POS terminal to automate, at at least one of the display device and the payment terminal, a charge to a transaction of the guest,
  (v) instructions, based on the response friction level being within a fifth range of friction values greater than the first, second, third, and fourth ranges of friction values, that, when executed by the POS terminal, cause the POS terminal to generate an alert that is transmitted to a mobile device of security personnel in the retail environment, and
  (vi) instructions, based on the response friction level being within a sixth range of friction values greater than the first, second, third, fourth, and fifth ranges of friction values, that, when executed by the POS terminal, cause the POS terminal to prevent the guest from (a) continuing to scan items with the scanner, (b) continuing the checkout process through the display device, or (c) completing the checkout process through the payment terminal.

11. The system of claim 1, wherein the operations further comprise:
  determining, based on execution of the selected (i) particular manual response and (ii) particular automated response and the stream of activity data received from the one or more monitoring devices, that the guest continues to perform the activity;
  adjusting, based on the determination that the guest continues to perform the activity, at least one of the risk impact score and the risk confidence score by a predetermined amount;
  increasing, based on the adjusted at least one risk impact score and risk confidence score, the response friction level; and
  selecting at least one of another manual response from among the plurality of candidate manual responses and another automated response from among the plurality of candidate automated responses based on the increased response friction level, wherein the selected another manual response or another automated response is an escalation of the previously selected particular manual response or the particular automated response.

12. The system of claim 1, wherein determining a risk impact score for the guest comprises:
  determining, based on transaction data received from the POS terminal during the checkout process, a value of an item associated with the activity of the guest; and
  assigning the risk impact score above a threshold impact value based on the value of the item exceeding a threshold item cost value.

13. The system of claim 1, wherein determining a risk impact score for the guest comprises:
  identifying, based on applying the model to the stream of activity data, a safety threat in the activity of the guest; and
  assigning the risk impact score above a threshold impact value based on the identified safety threat satisfying safety risk criteria.

14. The system of claim 1, wherein determining a risk confidence score for the guest comprises:
  analyzing, based on applying the model to the stream of activity data, the portion of the stream of activity data to identify a weapon, wherein the portion of the stream of activity data is image data; and assigning the risk confidence score above a threshold confidence value based on the identification of the weapon.

15. The system of claim 1, wherein determining whether at least one of the impact score and the confidence score satisfy risk criteria comprises (i) determining that at least one of the impact score and the confidence score exceed a safety risk threshold value or (ii) determining that at least one of the impact score and the confidence score exceed a shortage risk threshold value.

16. The system of claim 1, wherein determining whether at least one of the impact score and the confidence score satisfy risk criteria comprises:
aggregating the impact score and the confidence score to generate a general risk score for the guest; and
determining that the risk criteria is satisfied based on a determination that the general risk score exceeds a general risk threshold value.

17. The system of claim 1, wherein generating a response friction level for the activity of the guest comprises assigning a value to the response friction level that is (i) above a threshold friction value based on at least one of the impact score and the confidence score satisfying the risk criteria or (ii) below the threshold friction value based on at least one of the impact score and the confidence score not satisfying the risk criteria.

18. The system of claim 1, selecting (i) a particular manual response from among a plurality of candidate manual responses to the activity of the guest and (ii) a particular automated response from among a plurality of candidate automated responses to the activity of the guest comprises:
retrieving, from a data store, a watch list for the retail environment;
determining whether an objective identifier associated with the guest appears on the watch list; and
selecting at least one of (i) and (ii) based on a determination that the objective identifier associated with the guest appears on the watch list.

19. A method for automatically detecting and responding to potentially suspicious or risky activity in a retail environment, the method comprising:
receiving, from one or more monitoring devices positioned throughout a retail environment, a stream of activity data detailing activity within the retail environment;
applying a model to the stream of activity data to identify a portion of the stream of activity data corresponding to activity of a guest during a checkout process, wherein the model was trained to identify features in the portion of the stream of activity data indicative of a risk event;
identifying, based on the portion of the stream of activity data, whether a risk event is associated with the activity of the guest during the checkout process;
determining a risk impact score for the guest based on at least on of (i) a determination that the risk event is associated with the activity of the guest and (ii) the activity of the guest satisfying risk impact criteria;
selecting (i) a particular manual response from among a plurality of candidate manual responses to the activity of the guest and (ii) a particular automated response from among a plurality of candidate automated responses to the activity of the guest based, at least in part, on the risk impact score satisfying at least one of manual response criteria and automated response criteria;
transmitting instructions to a POS terminal to implement the particular automated response, wherein transmitting the instructions causes the particular automated response to be provided using one or more of a scanner, a display device, and a payment terminal of the POS terminal;
selecting one or more mobile devices from among a plurality of mobile devices based, at least in part, on location information for the mobile devices relative to a location of the POS terminal; and
transmitting instructions to implement the particular manual response to the selected one or more mobile devices, wherein transmitting the instructions causes corresponding instructions to be outputted in a user interface at the selected one or more mobile devices to prompt corresponding employees to perform the manual response with regard to the guest at the POS terminal.

20. The method of claim 19, further comprising:
determining a risk confidence score for the guest, wherein the risk confidence score indicates a likelihood that the activity of the guest is associated with the risk event;
generating a response friction level for the activity of the guest based on determining whether at least one of the impact score and the confidence score satisfy risk criteria, wherein the response friction level corresponds to a escalation of a type of response to be taken for the activity of the guest; and
selecting (i) the particular manual response from among the plurality of candidate manual responses to the activity of the guest and (ii) the particular automated response from among the plurality of candidate automated responses to the activity of the guest based, at least in part, on the response friction level satisfying at least one of the manual response criteria and the automated response criteria.

* * * * *